(12) United States Patent
Hinderks et al.

(10) Patent No.: US 6,212,201 B1
(45) Date of Patent: Apr. 3, 2001

(54) METHOD AND APPARATUS FOR DYNAMIC ALLOCATION OF TRANSMISSION BANDWIDTH RESOURCES AND FOR TRANSMISSION OF MULTIPLE AUDIO SIGNALS WITH A VIDEO SIGNAL

(75) Inventors: Larry W. Hinderks, Reno, NV (US); Laurence A. Fish, San Diego, CA (US); Ian Lerner, La Jolla, CA (US); Roswell R. Roberts, III, San Diego, CA (US)

(73) Assignee: Starguide Digital Networks, Inc., Reno, NV (US)

( * ) Notice: Subject to any disclaimer, the term of this patent is extended or adjusted under 35 U.S.C. 154(b) by 0 days.

(21) Appl. No.: 09/347,103

(22) Filed: Jul. 2, 1999

Related U.S. Application Data

(63) Continuation of application No. 08/698,956, filed on Aug. 16, 1996, now Pat. No. 6,049,551
(60) Provisional application No. 60/002,445, filed on Aug. 16, 1995.

(51) Int. Cl.[7] ................................. H04J 3/16; H04J 3/22
(52) U.S. Cl. ....................... 370/468; 370/477; 348/388; 348/423
(58) Field of Search ................................. 370/314, 326, 370/345, 437, 468, 471, 477, 506, 535, 537, 538; 348/388, 390, 423, 487; 375/240, 260; 455/452

(56) References Cited

U.S. PATENT DOCUMENTS

| | | | |
|---|---|---|---|
| 3,898,376 | * 8/1975 | Nabeyama | 348/24 |
| 4,763,321 | * 8/1988 | Calvignac | 370/236 |
| 5,111,292 | * 5/1992 | Kuriacose | 348/384 |
| 5,282,202 | * 1/1994 | Bernstein | 370/468 |
| 5,396,497 | * 3/1995 | Veltman | 348/423 |
| 5,461,619 | * 10/1995 | Citta et al. | 370/468 |
| 5,479,447 | * 12/1995 | Chow et al. | 375/260 |
| 5,490,136 | * 2/1996 | Sereno et al. | 370/342 |
| 5,751,356 | * 5/1998 | Suzuki | 348/390 |

OTHER PUBLICATIONS

Sharma M., MCPC VSATs for rural network, Digital Satellite communications, 1995, Tenth International Conference, pp. 484–490, 1994.*

* cited by examiner

*Primary Examiner*—Alpus H. Hsu
(74) *Attorney, Agent, or Firm*—McAndrews, Held & Malloy, Ltd.; Robert C. Ryan

(57) ABSTRACT

A method and apparatus are provided for dynamically allocated multiple slots within a multi-channel multi-carrier transmission system. The slots may be allocated sequentially or non-sequentially. The data transmission rate for each slot remains constant, while multiple slots may be allocated to a single user service. Each carrier signal contains header data regarding all other carriers associated with the transmission system to identify the allocation of slots to user services. In an alternative embodiment, an encoding and transmitting system is provided for transmitting one or more video and audio encoded signals in a time division multiplexed manner along separate channels having fixed bandwidths. Multiple audio channels may be transmitted simultaneously with a related single video channel, and vice versa. The time division multiplexed audio/video signals may be transmitted over a single carrier or over multiple carriers.

20 Claims, 21 Drawing Sheets

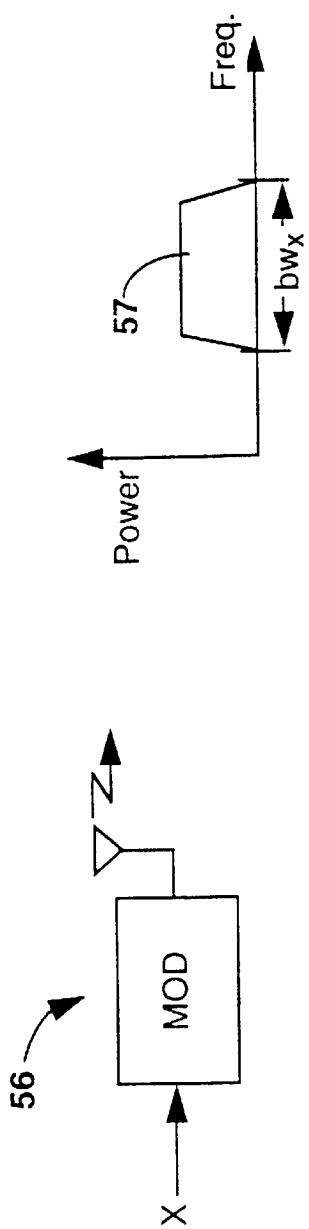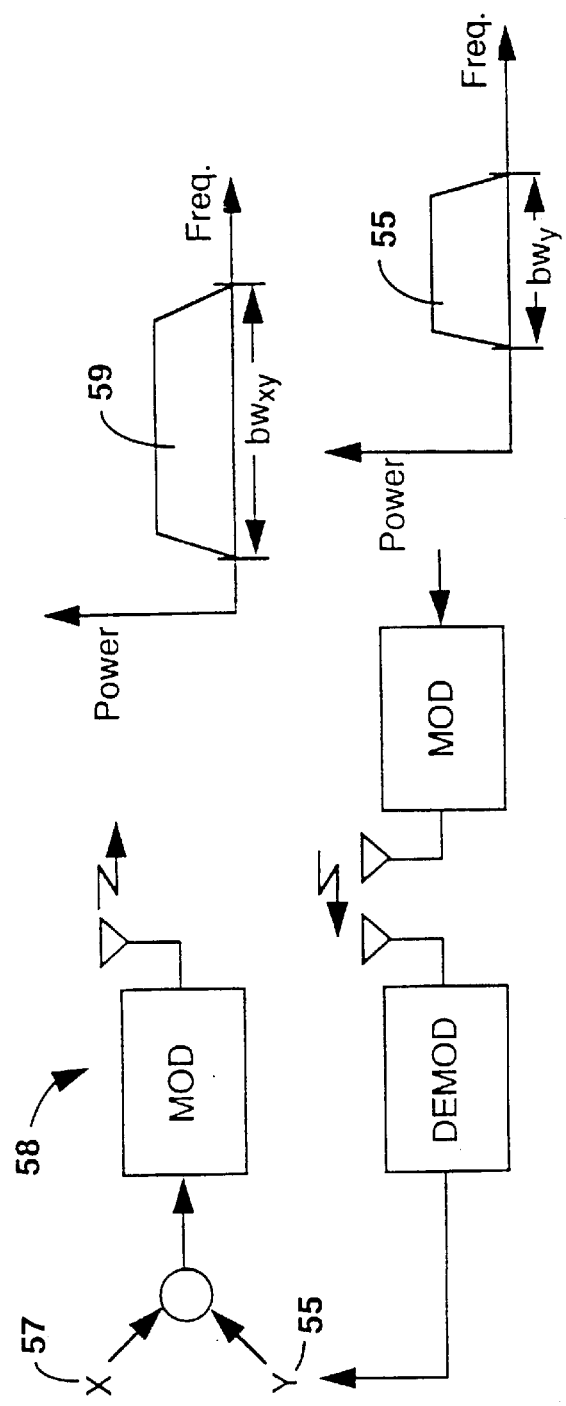
Fig. 9 (A)
Fig. 9 (b)

| Service (SV) # | Carrier Center Freq. | Band-Width | Total # of Slots | # of Slots Used | Slot Nos. |
|---|---|---|---|---|---|
| 1 | $f_1$ | $bw_1$ | 4 | 2 | 1, 2 |
| 2 | $f_1$ | $bw_1$ | 4 | 1 | 3 |
| 3 | $f_2$ | $bw_2$ | 4 | 1 | 1 |
| 4 | $f_2$ | $bw_2$ | 4 | 2 | 2, 3 |
| 5 | $f_3$ | $bw_3$ | 4 | 3 | 1, 2, 3 |

Fig. 20

METHOD AND APPARATUS FOR DYNAMIC ALLOCATION OF TRANSMISSION BANDWIDTH RESOURCES AND FOR TRANSMISSION OF MULTIPLE AUDIO SIGNALS WITH A VIDEO SIGNAL

RELATED PROVISIONAL APPLICATION

The present application relates to, and claims priority from Ser. No. 08/698,956, filed Aug. 16, 1996, now U.S. Pat. No. 6,049,551, which is co-pending with this application and is a continuation of Ser. No. 08/698,956, filed Aug. 16, 1996, which is co-pending with this application and is a provisional application serial No. 60/002,445, filed Aug. 16, 1995.

FIELD OF THE INVENTION

The present invention relates generally to a method and apparatus for dynamically allocating transmission bandwidth resources. Utilization of available bandwidth is maximized by a using a multiple channel, multiple carrier (MCMC) transmission scheme. The transmission rate capability of each carrier is parsed down into smaller slots which can be dynamically allocated and multiplexed to facilitate any sized user, from one slot to multiple slots. Multiple carriers are used to transmit the allocated data slots on available portions of the transmission spectrum. At least one slot of information on each carrier will be used for control information so that channels or services can be located on that particular carrier. Additionally, a separate service might be used to provide system-wide mapping or administrative functions. As a result, a user can find any service even if a channel or service location has changed. This transmission scheme allows for wide user flexibility, while also maximizing use of available transmission spectrum.

In an alternative embodiment, the present invention generally relates to a method and apparatus for transmitting at least one digitally encoded video signal with at least two digitally encoded audio signals related thereto. According to this alternative embodiment, the video and audio digital signals are combined through time division multiplexing to produce an aggregate audio/video bitstream containing data packets transmitted along at least two channels of fixed bandwidth, thereby maintaining a known fixed delay between packets of data in a given channel.

BACKGROUND OF THE INVENTION

Available bandwidth on transmission systems is a valuable commodity whose value continues to increase as more and more users and applications crowd the spectrum. As a result, maximizing the use of available bandwidth is an important concern for the industry. To date, systems have not adequately provided for user flexibility in conjunction with maximum use of available bandwidth.

Current technology permits modulation of a binary base band signal into a radio frequency (RF) signal for transmission and demodulation back into base band. As shown in FIG. 1, the base band signal 1 enters the modulator 3 and is converted into RF for transmission and receipt over antennas 5, 7. Demodulator 9 converts the received signal back into a base band signal 11. This transmission scheme is known as single channel per carrier (SCPC).

Modulators convert base band signals from binary into the frequency spectrum through a variety of modulation techniques. Common modulation techniques include binary phase shift keying (BPSK) and quadraphase shift keying (QPSK). BPSK has a conversion rate of approximately 1 kilohertz (KHZ) per 1 kilobit (KB). QPSK has a conversion rate of approximately 0.5 KHZ per 1 KB. Accordingly, QPSK is more efficient in that nearly twice as many bits of information can be transmitted over a similar frequency bandwidth. However, noise tradeoffs exist as data conversion rates increase. This limits the effectiveness of increasing bandwidth usage through modulation techniques with even higher data conversion rates.

As shown in FIG. 2, SCPC systems generate a separate RF carrier signal 13, 15 for each base band input signal 14, 16. FIG. 3 shows a plot of power versus frequency for the carrier signals 13, 15 wherein each signal occupies a separate center frequency 17, 19 with a separate bandwidth 21, 23. Since each channel—with a separate carrier—occupies different space on the frequency spectrum, such SCPC systems are inherently inefficient for multi-channeled systems.

Referring to FIG. 4, to maximize efficiency, the space 25 between each carrier signal must be minimized. However, as shown in FIG. 5, if this space is minimized too much, then the edges, or "skirts" 27, of the carrier signals overlap and interfere with each other. This can lead to erroneous and noisy demodulation of the RF signal. Alternatively, as shown in FIG. 6, the skirts 27 can be truncated via filtering, but then part of the original carrier signal has been excluded. This again could appear as errors or noise upon demodulation.

Current technology also includes multiple channel per carrier (MCPC) systems as shown in FIG. 7. With this system, multiple binary base band signals (or channels) 31, 33 are multiplexed via a multiplexor 35 and then fed into a modulator 37. The transmitted RF signal is then demodulated (via 39) and demultiplexed (via 41) into its component base band signals 43, 45. As shown by FIGS. 8(*a*) and 8(*b*), separate carriers—that might be produced by signals 31, 33 in an SCPC system—would have the potentially noisy skirt overlap 49, and a collective bandwidth 47. By multiplexing the signals together, the resulting RF signal shown in FIG. 8(*b*) would have a comparable bandwidth 51 and yet carry more information (e.g. up to 20% more bits), with less noise, due to more efficient use of the carrier signal across the corresponding bandwidth 51. Accordingly, MCPC systems are inherently more efficient than SCPC systems.

While MCPC systems might be more efficient, they are often used in very inefficient ways due to the inflexibility of existing transmission systems. For instance, to gain the benefits of multiplexing two (or more) signals together, information must often be transported or transmitted back to the facility where the MCPC multiplexing and transmission ultimately occurs. This practice is known as "backhauling" information. Referring to FIG. 9(*a*) an SCPC system 56 is shown with the resulting plot of carrier signal 57. FIG. 9(*b*) shows an MCPC system 58 which multiplexes the signal 57 with the backhauled signal 55 to produce the resulting MCPC carrier signal 59. FIG. 10 demonstrates the relative inefficiency of backhauling; not only is the bandwidth of signal 59 being used on the frequency spectrum, the bandwidth of signal 55 is also being used. Hence, the use of multiple carriers to create an MCPC signal is relatively inefficient, particularly when backhauling is employed, because more frequency bandwidth is ultimately used than with the MCPC system alone.

The applicant has recognized the need for a multiple channel multiple carrier system (MCMC) which is more flexible and allows users of all sizes to access the system.

Multiple carriers, each carrying multiple channels, can be spread out over the available frequency spectrum, thus maximizing bandwidth usage. Each carrier will carry control header information which will allow location and access to all possible channels spread out over all possible carriers.

Existing transmission systems transport audio and video data in satellite and cable TV applications. FIG. 23 illustrates an exemplary audio/video transmission system including an audio/video encoder 400 which communicates with a statistical remultiplexor 402 which in turn communicates with a modulator 404. The encoder 400 receives audio and video signals along input lines 401 and 403 and outputs encoded packets of audio and video data along lines 406 and 408, respectively. The statistical remultiplexor 402 combines the audio and video data packets (according to the format illustrated in FIG. 25) and outputs same as an aggregate bitstream along line 412. The aggregate bitstream is transmitted to a remote destination via antenna 418 by the modulator 404. Feedback lines 410 and 414 are provided to maintain a desired timing relation between the data transmission rates of the encoder 400, remultiplexor 402 and transmit module 404.

The transmitted bitstream is received by a demodulator and the audio and video data packets are demultiplexed and decoded into separate audio and video data streams. These decoded data streams are processed and displayed to end viewers. One such demultiplexer and decoding system has been proposed LSI Logic Corporation of California (Model No. L64007 MPEG-2 Transport Demultiplexor). The system proposed by LSI Logic complies with the international standard ISO/IEC 13818-1 MPEG-2 systems specification. As shown in FIG. 25, the aggregate bitstream 450 is composed of plurality of data packets 452, each of which includes a data section 454 and a "presentation time stamp" 456 (explained below in more detail). As shown in FIG. 25, the statistical multiplexor 402 (FIG. 23) intersperses the audio and video packets in a non-uniform manner. By way of example, a single audio packet 458 may be followed by two video packets 460 and 462, which are followed by alternating audio and video packets 464–472. The statistical remultiplexor 402 controls the order in which the audio and video packets 458–472 are combined.

The presentation time stamps 456 are provided within each data packet 452 by the encoder 400 to enable synchronization and realignment, at the downstream end, between the audio and video signals. Each time stamp 456 represents a timing offset, with respect to a reference time Tr, at which corresponding audio or video packet is to be played/displayed.

However, conventional audio/video encoding and decoding have met with limited success. These existing systems have been unable to combine multiple audio and video signals into a single aggregate bitstream in an optimal manner. As explained above, conventional systems utilize statistical remultiplexors 402 to combine audio and video packets.

FIG. 26 illustrates an exemplary aggregate bitstream produced by a statistical remultiplexor which receives input signals from multiple audio and video encoders. In the example of FIG. 26, it is assumed that three audio and video encoders are utilized, denoted encoders A, B and C. According to the conventional technique, the statistical remultiplexor combines audio and video packets from these multiple encoders A–C in a statistical fashion (as shown in FIG. 26). Thus, packets pertaining to a particular video encoder or a particular audio encoder may be separated by several packets from different encoders. Time stamps generated by a single encoder represent an offset which is reset to a new reference time at time intervals of a duration only sufficient to account for the maximum delay between audio and video data packets for a single encoder. Hence, packets statistically multiplexed from two or more encoders exceed the time interval between reference times. Accordingly, the statistical remultiplexor must adjust each presentation time stamp to account for the increased delay due to the use of multiple encoders. These modified time stamps are denoted by reference numerals 480–494.

However, the foregoing statistical multiplexing process is excessively complex, slow and undesirable.

OBJECTS OF THE INVENTION

The present invention has various embodiments that achieve one or more of the following features or objects:

It is an object of the present invention to provide a multiple channel, multiple carrier transmission system with dynamically allocable base band signal slots (or channels) to accommodate any sized service.

It is another object of the present invention to provide a multiple channel, multiple carrier transmission system wherein each carrier can by dynamically located to maximize bandwidth usage on the frequency spectrum.

It is a further object of the present invention to provide a multiple channel, multiple carrier transmission system wherein each carrier contains header information which can provide access to all services on the series of carriers.

It is yet a further object of the present invention to provide a multiple channel, multiple carrier transmission system wherein each carrier contains header information which can provide access to all services on the series of carriers, and wherein additional service space is allocated for such tasks as information transfer, service identification, and service control.

It is yet a further object of the present invention to provide a system for digitally encoding and transmitting at least one digital video signal along with multiple digital audio signals.

It is a corollary object of the present invention to provide an audio/video encoding and transmitting system which transmits multiple audio signals related to a single video signal in a time division multiplexed manner.

It is a further object of the present invention to provide a digital encoding and transmitting system which avoids the need to adjust presentation time stamps generated within each encoder by maintaining a fixed delay between data packets from different encoders.

It is yet a further object of the present invention to provide a digital encoding and transmitting system which assigns fixed bandwidths to each audio and video signal to be transmitted.

SUMMARY OF THE INVENTION

The disclosed invention overcomes the aforementioned inefficiencies of prior transmission systems by providing a transmission system that is flexible and efficient. The present invention provides a multiple channel, multiple carrier transmission system with dynamically allocable slots (or channels) that can be combined to form any sized service. Slots could be allocated sequentially or nonsequentially. The data rate of each slot is relatively small compared to the data rate of the whole system. This allows each user to purchase and use only the necessary number of bits for a particular application. As user needs change, the slots can be dynamically reallocated without affecting the efficiency of the system, the ease of use by the user without affecting other slots used by different users.

Each carrier signal contains reserved header data regarding all other carriers associated with the transmission system. This allows all services (e.g. allocated combinations of slots) to be located regardless of which carrier signal contains that service to be located. Accordingly, a plurality of services—each consisting of one or many slots—can be spread out over a plurality of carrier signals and so transmitted. When operating with a plurality of carriers, each carrier signal can be dynamically tuned to fill available spaces in the transmission frequency spectrum, thus maximizing use of all available transmission bandwidth.

In an alternative embodiment, a method and apparatus are provided for digitally encoding and transmitting at least one video signal and at least two related audio signals. According to this alternative embodiment, a video encoder is provided along with at least two audio encoders. The audio and video encoders generate corresponding audio and video bitstreams, each of which comprises a plurality of packets containing data sections. The audio and video bitstreams are delivered to a multiplexor which effects time division multiplexing upon to combine the audio and video bitstreams into an aggregate audio/video bitstream. The aggregate audio/video bitstream contains at least two independent channels of fixed bandwidth for separately transmitting designated ones of the video and audio bitstreams. A modulator transmits the aggregate audio/video bitstream. According to the above described alternative embodiment, fixed delays are maintained between packets within a single channel, thereby avoiding the need to adjust any presentation time stamps which may be generated by the encoders.

Additional features and advantages of the present invention will become apparent to one skilled in the art upon consideration of the following detailed description of the present invention.

BRIEF DESCRIPTIONS OF THE DRAWINGS

FIG. 9(a) shows a block diagram of an SCPC system and a resulting plot of power versus frequency for a carrier signal with a given bandwidth.

FIG. 9(b) shows a block diagram of an MCPC system, along with an SCPC system for backhauling, and a resulting plot of power versus frequency for the MCPC generated signal.

Figure 1:
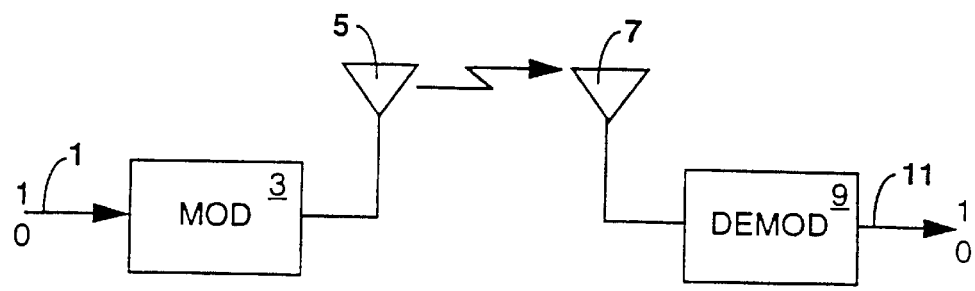
FIG. 1 is a block diagram illustrating a single channel per carrier (SCPC) transmission scheme.
Figure 2:
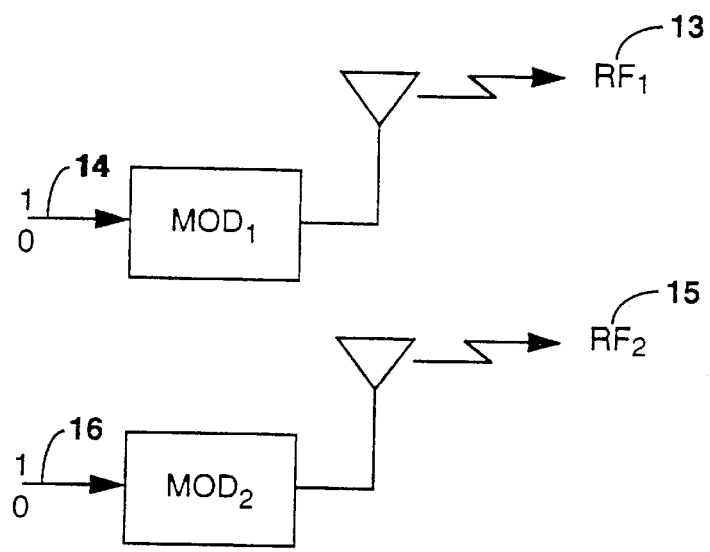
FIG. 2 is a block diagram illustrating the generation of two separate carrier signals from two separate SCPC transmission schemes.
Figure 3:
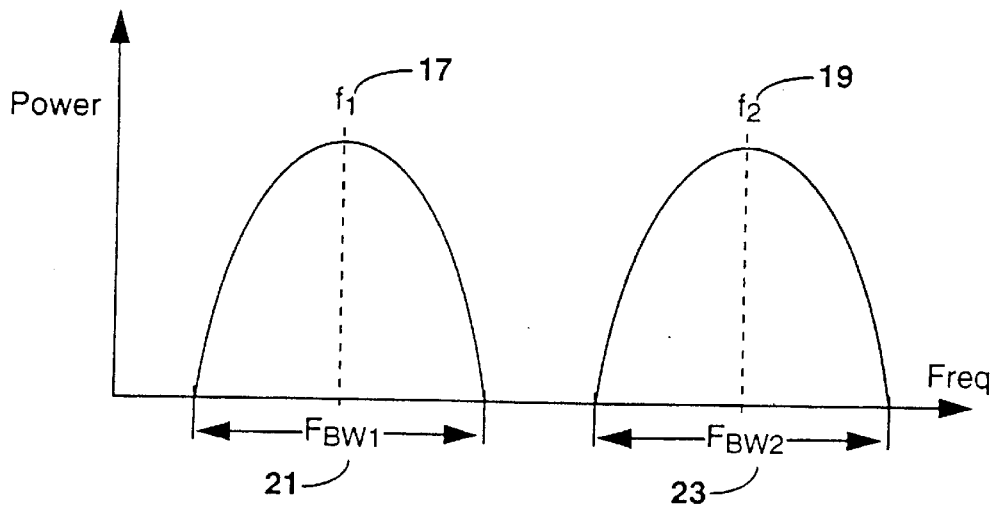
FIG. 3 is a plot of power versus frequency for the two carrier signals of FIG. 2.
Figure 4:
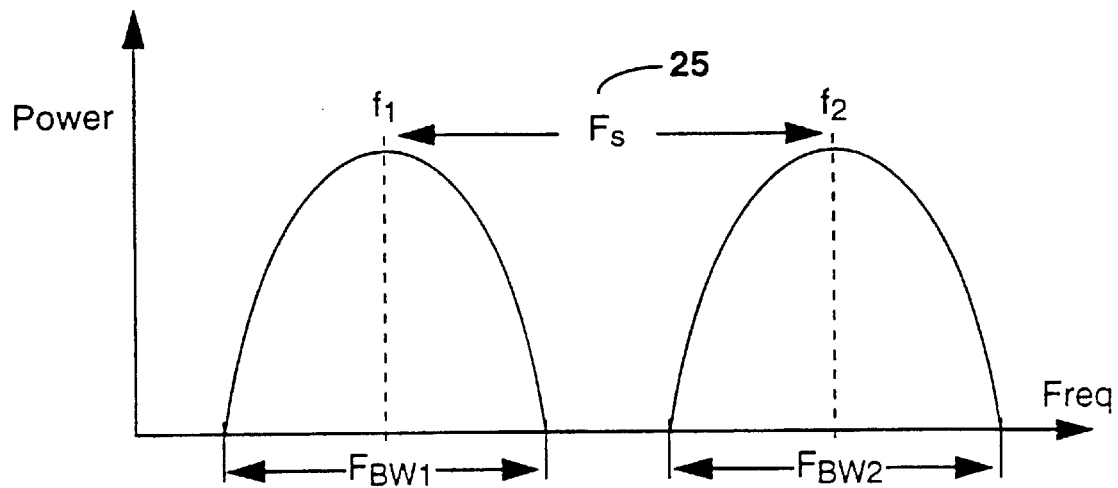
FIG. 4 is a plot of power versus frequency for two example carrier signals showing the desire to minimize the frequency spacing between the two signals.
Figure 5:
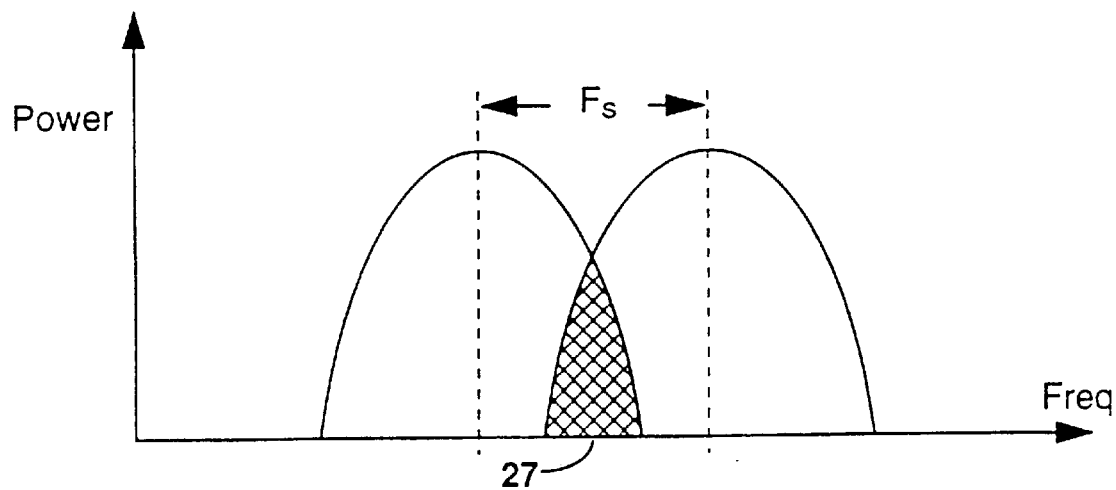
FIG. 5 is a plot of power versus frequency for two example carrier signals wherein the frequency spacing has been minimized to the point that the carrier signal skirts overlap.
Figure 6:
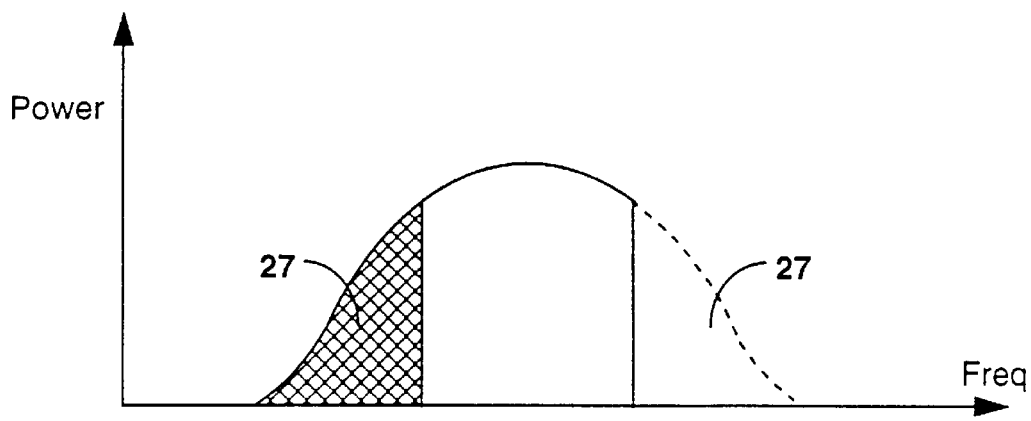
FIG. 6 is a plot of power versus frequency for an example carrier signal wherein the skirts have been filtered off.
Figure 7:
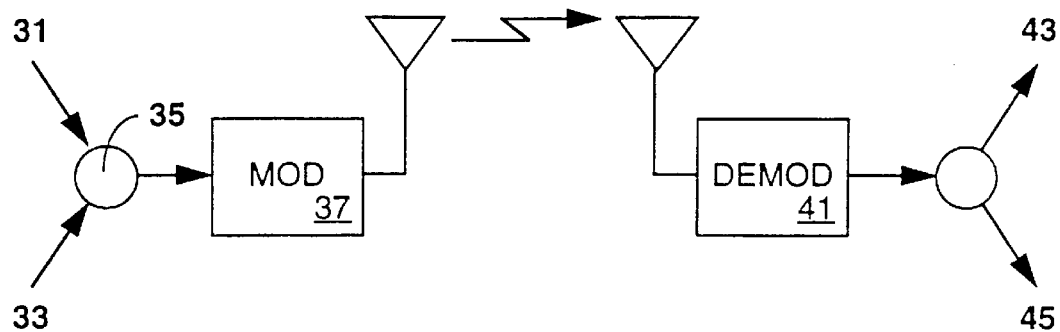
FIG. 7 is a block diagram illustrating a multiple channel per carrier transmission scheme.
Figure 8:
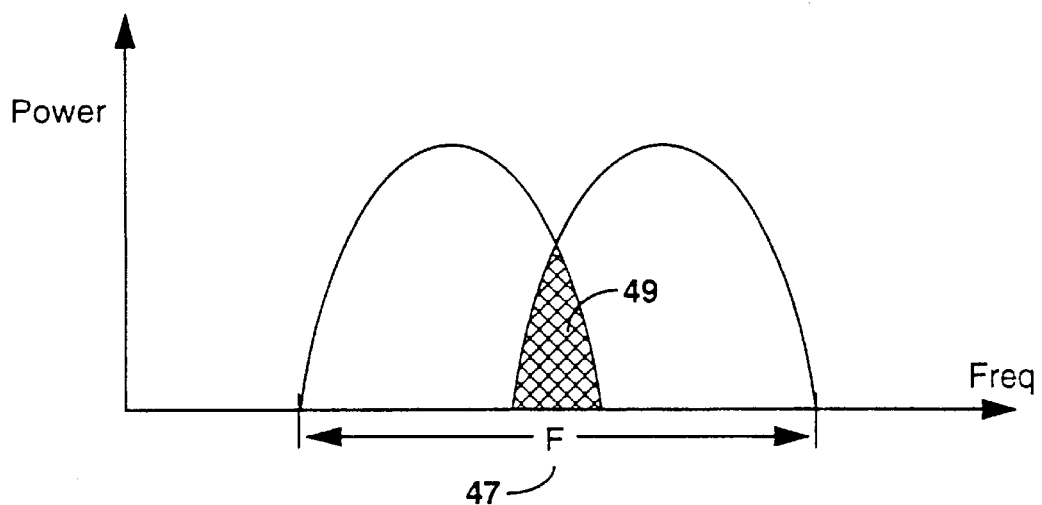
FIG. 8(a) is a plot of power versus frequency for two example carrier signals showing skirt overlap for a given bandwidth.
FIG. 8(b) is a plot of power versus frequency for the two example carrier signals of FIG. 8(a) which have been multiplexed before modulation.
Figure 8:
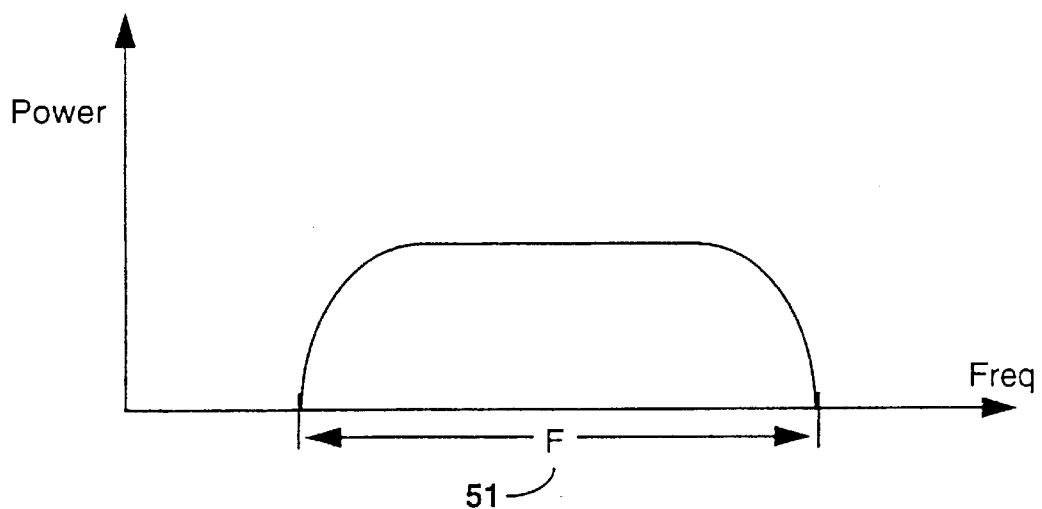
Figure 10:
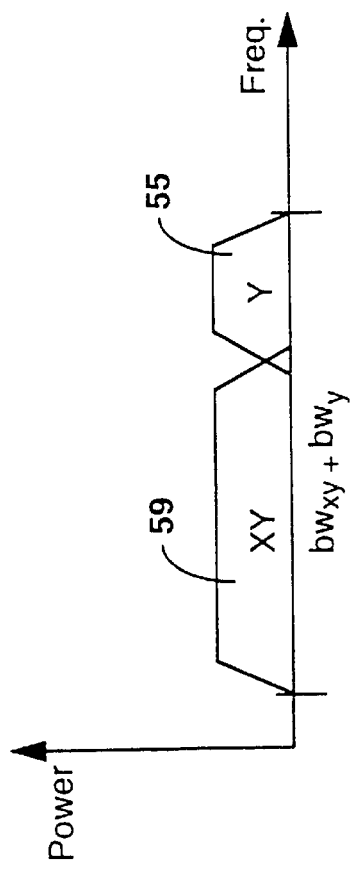
FIG. 10 is a plot of power versus frequency for the MCPC signal and the SCPC signal of FIG. 9(b).
Figure 11:
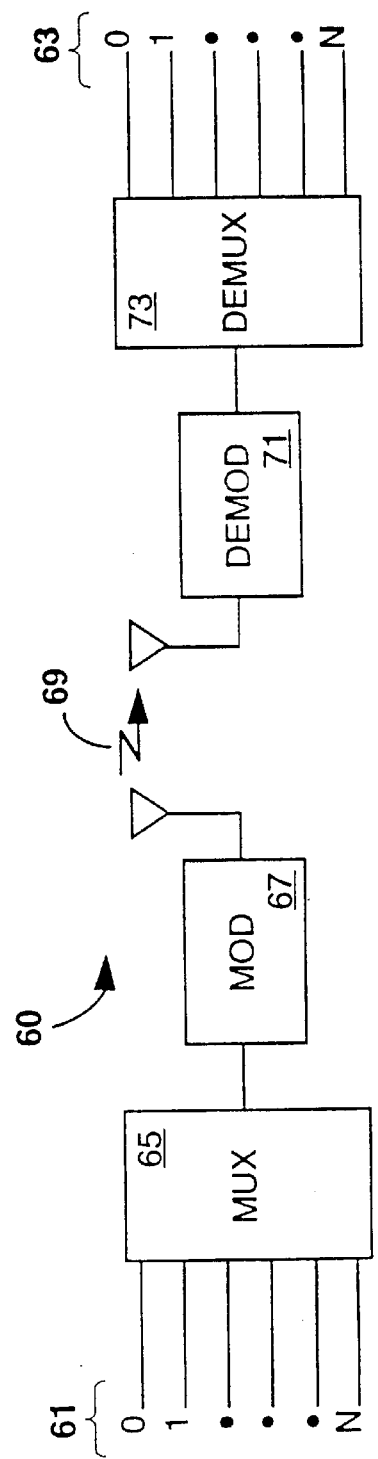
FIG. 11 shows a block diagram of an MCPC system with a plurality of input and output channels.
Figure 13:
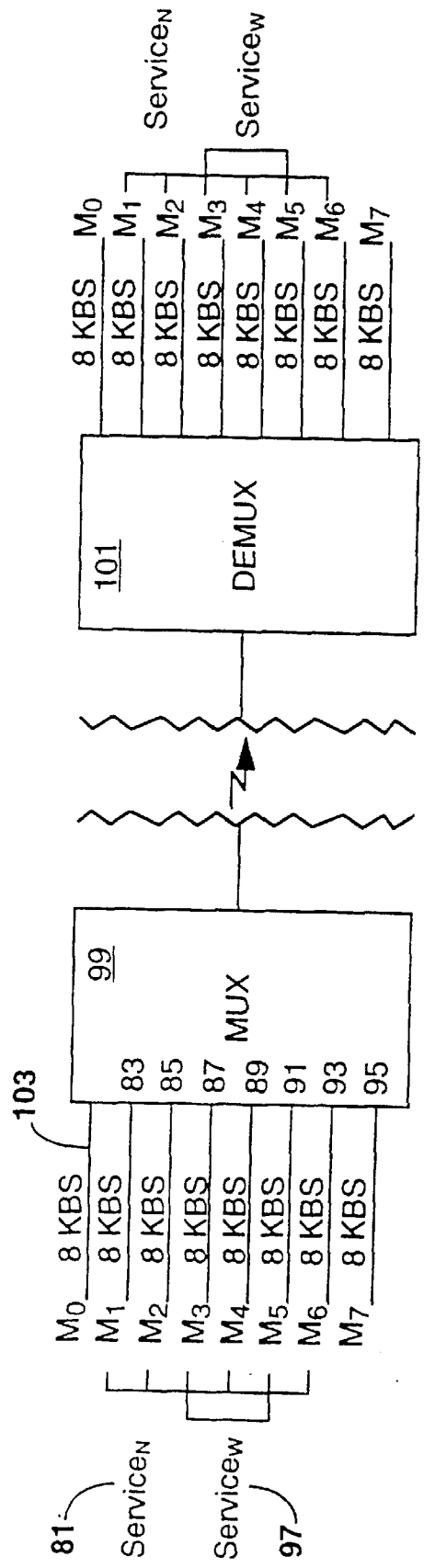

FIG. 13 a block diagram of the multiplexor and demultiplexor sections of the MCPC system of FIG. 11, with yet other channels allocated for other services.

Figures 14, 15:
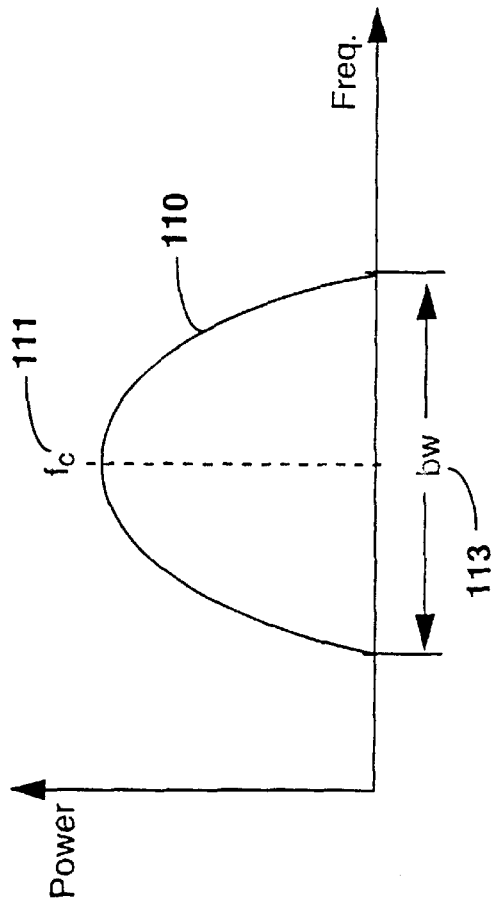

FIG. 14 is a table showing the type of information which allows a user to locate and use a particular service on a system-wide basis.

FIG. 15 is a plot of power versus frequency for a carrier signal, with a given center frequency and bandwidth, which contains the services of FIGS. 13 and 14.

Figure 16:
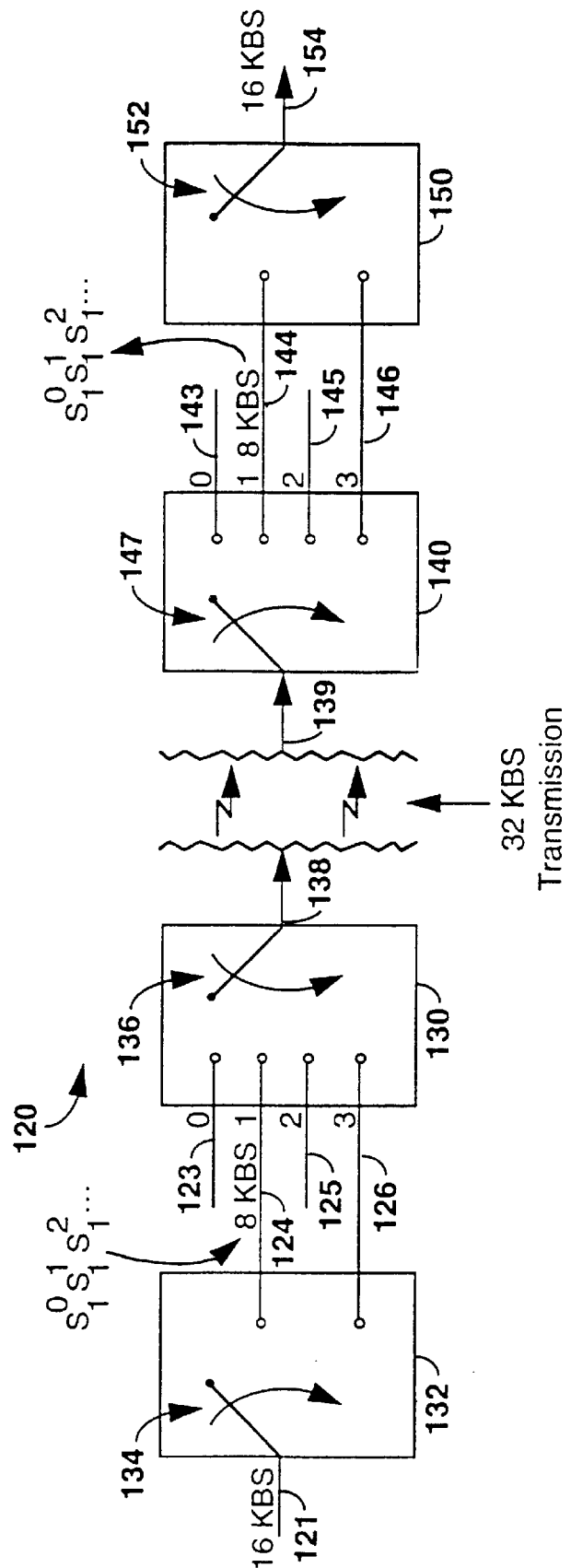

FIG. 16 is a block diagram illustrating an MCPC system with four slots and secondary multiplexors for services spanning more than one slot.

Figure 17:
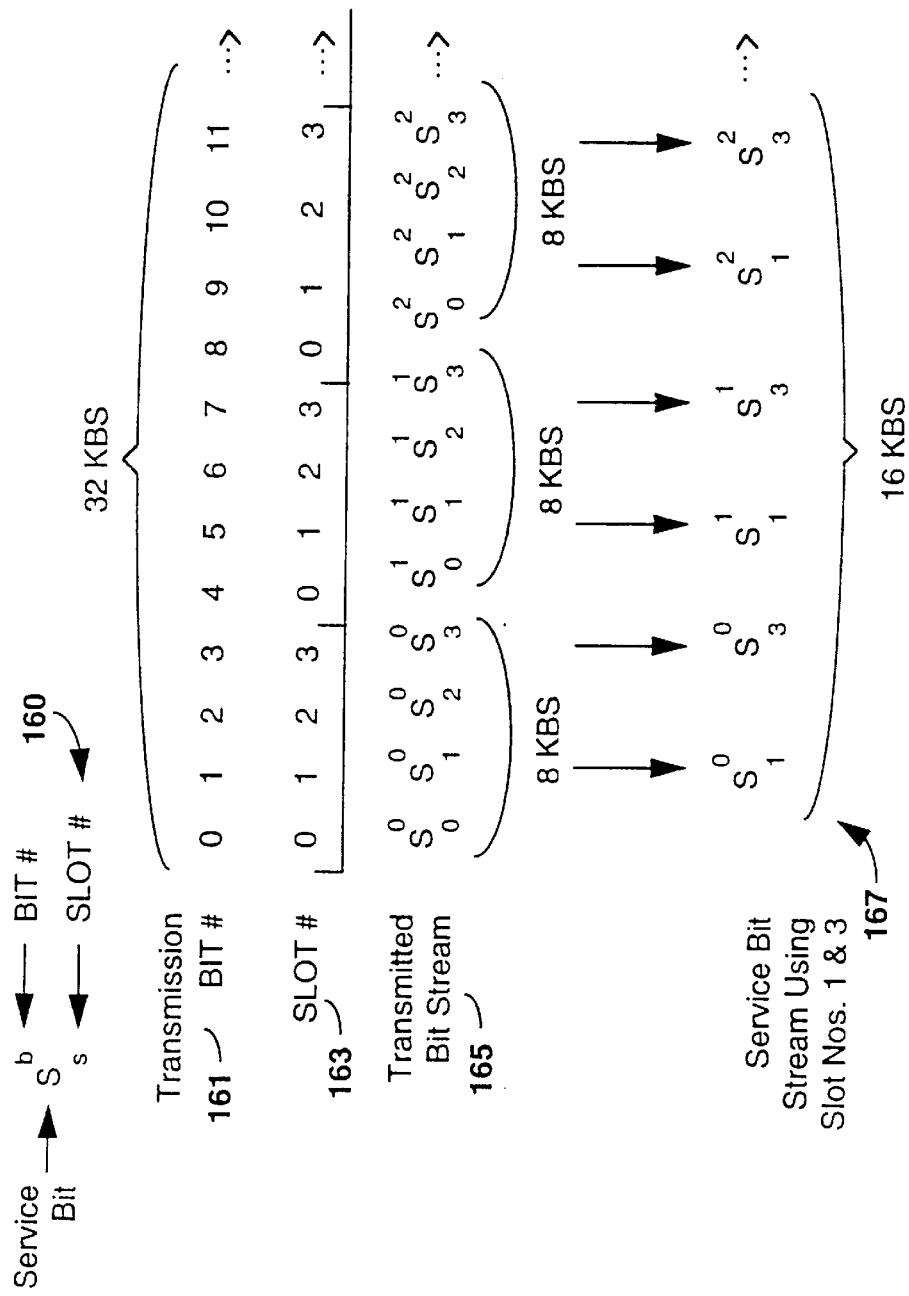

FIG. 17 is a table showing the bitstream patterns of the MCPC system of FIG. 16, and the resulting multi-slot service bitstream.

Figure 18:
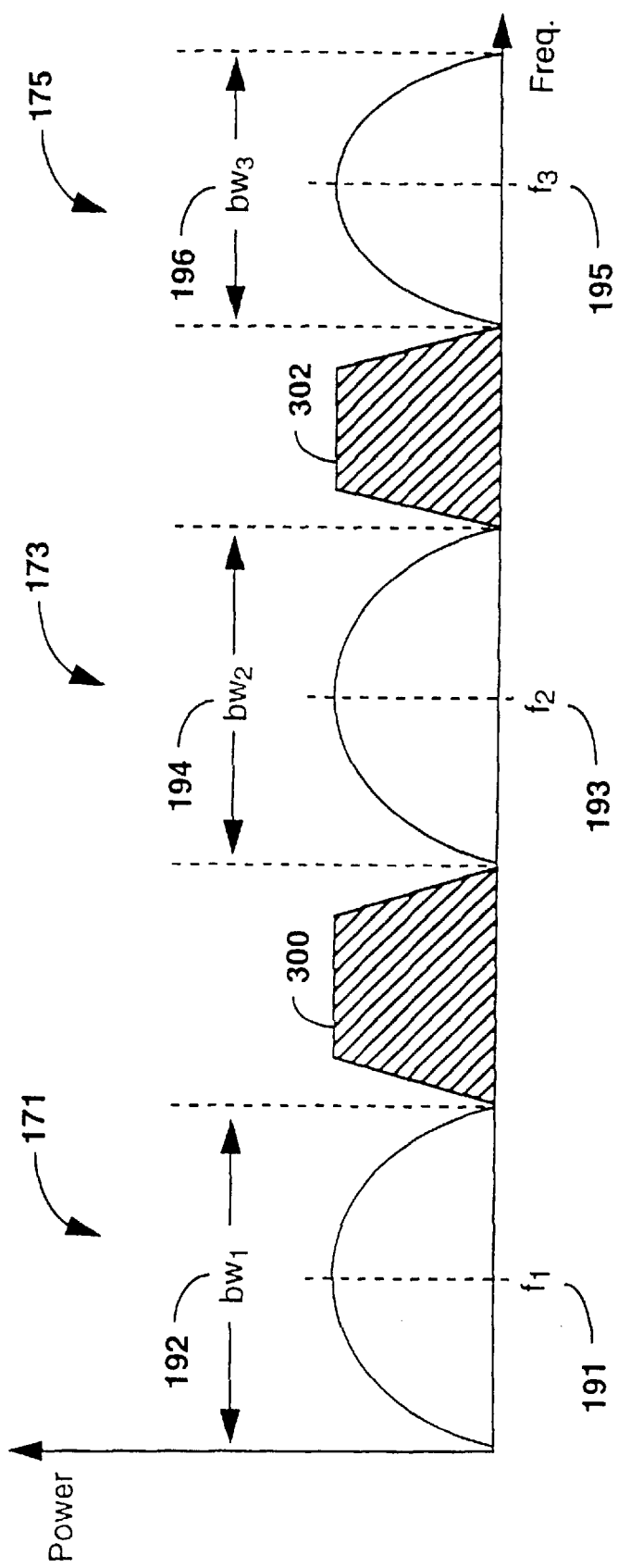

FIG. 18 is a plot of power versus frequency showing two unaccessible bandwidth areas and three carrier signals oriented in the available spaces between the unaccessible areas.

Figure 19:
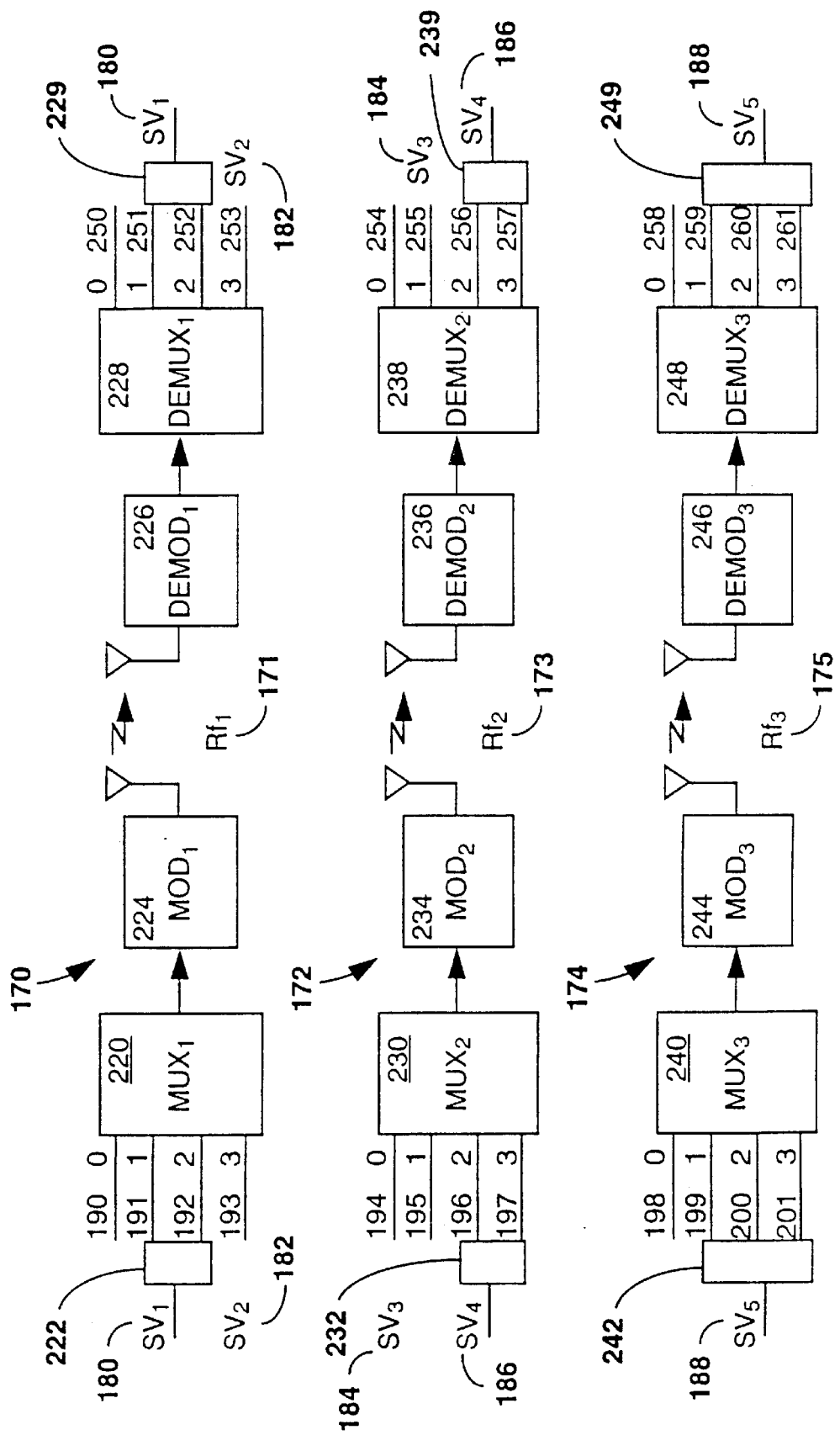

FIG. 19 is a block diagram illustrating a multiple channel, multiple carrier transmission scheme, with multiple services, corresponding to the carrier signals of FIG. 16.

FIG. 20 is a table showing the type of information which allows a user to locate and use a particular service on the MCMC system of FIGS. 18 and 19.

Figure 21:
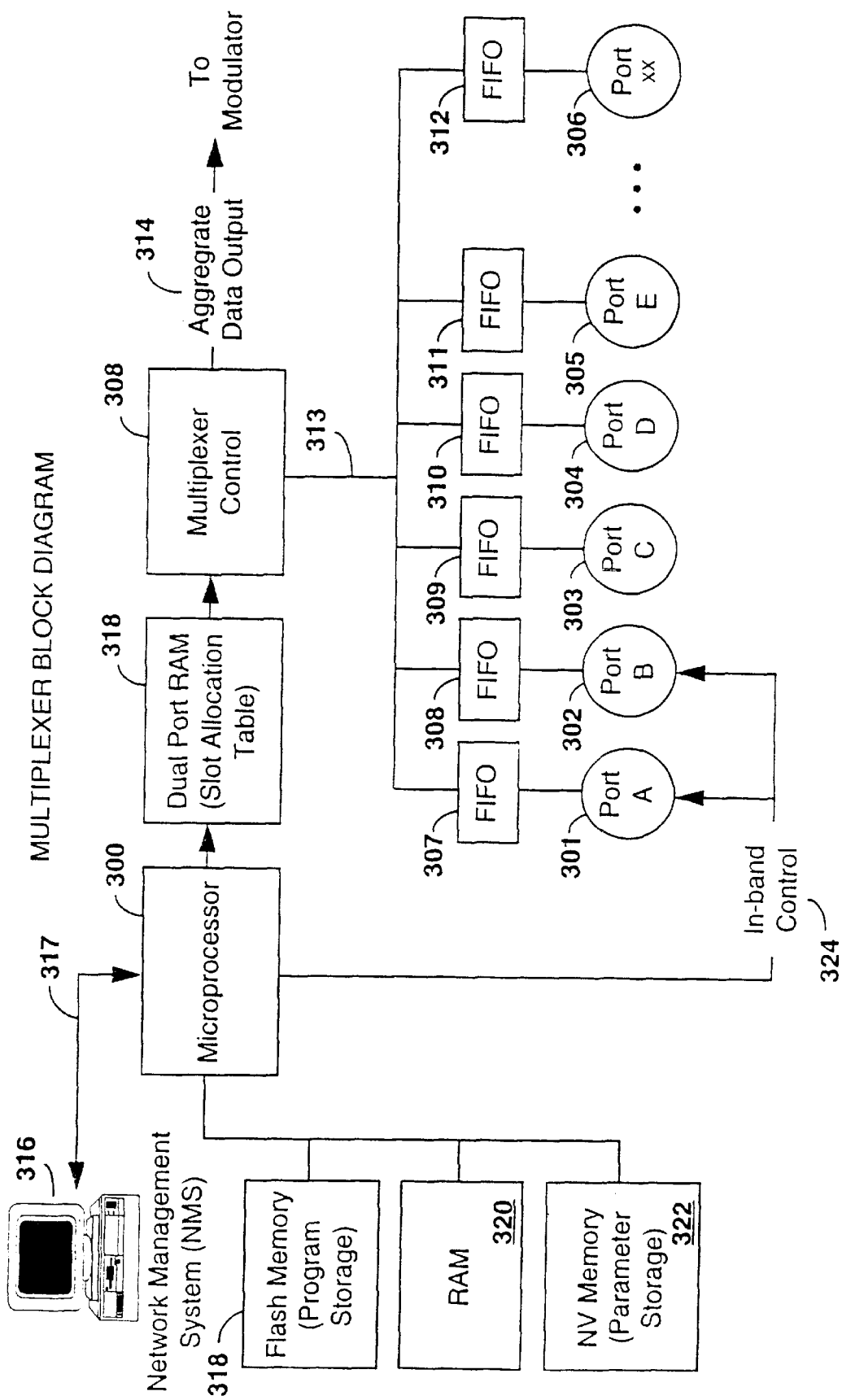

FIG. 21 is a block diagram of a multiplexor configuration as used in an embodiment of the MCMC system.

Figure 22:
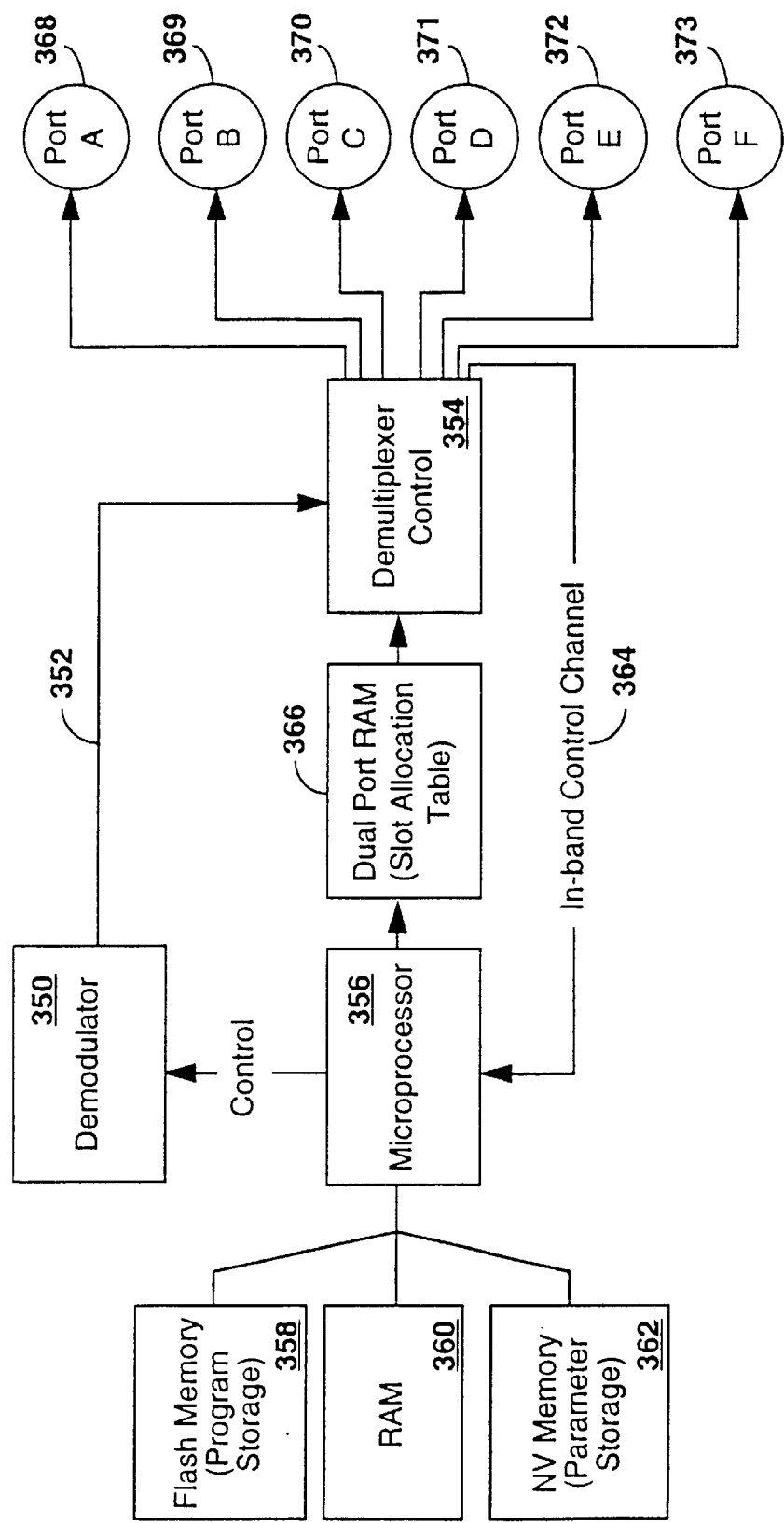

FIG. 22 is a block diagram of a receiver configuration as used in an embodiment of the MCMC system.

Figure 23:
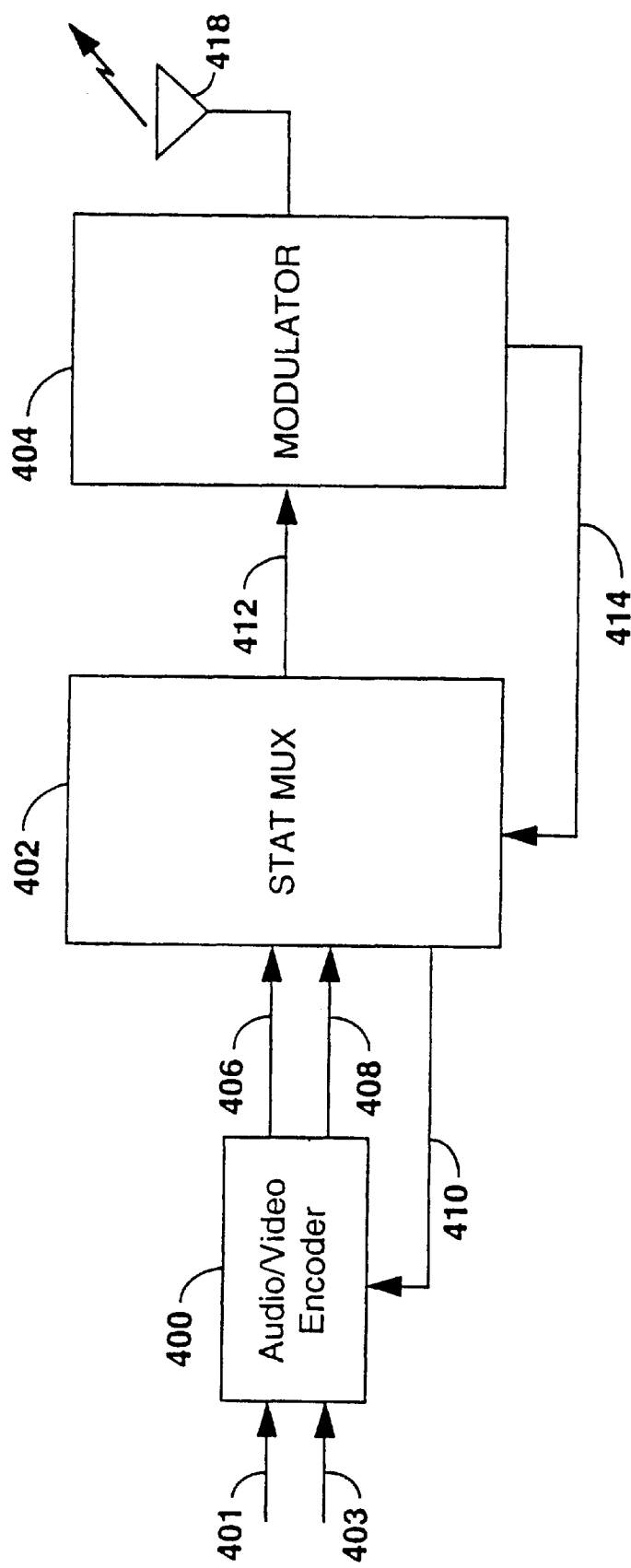

FIG. 23 illustrates a block diagram of an exemplary conventional audio/video encoding and transmitting system.

Figure 24:
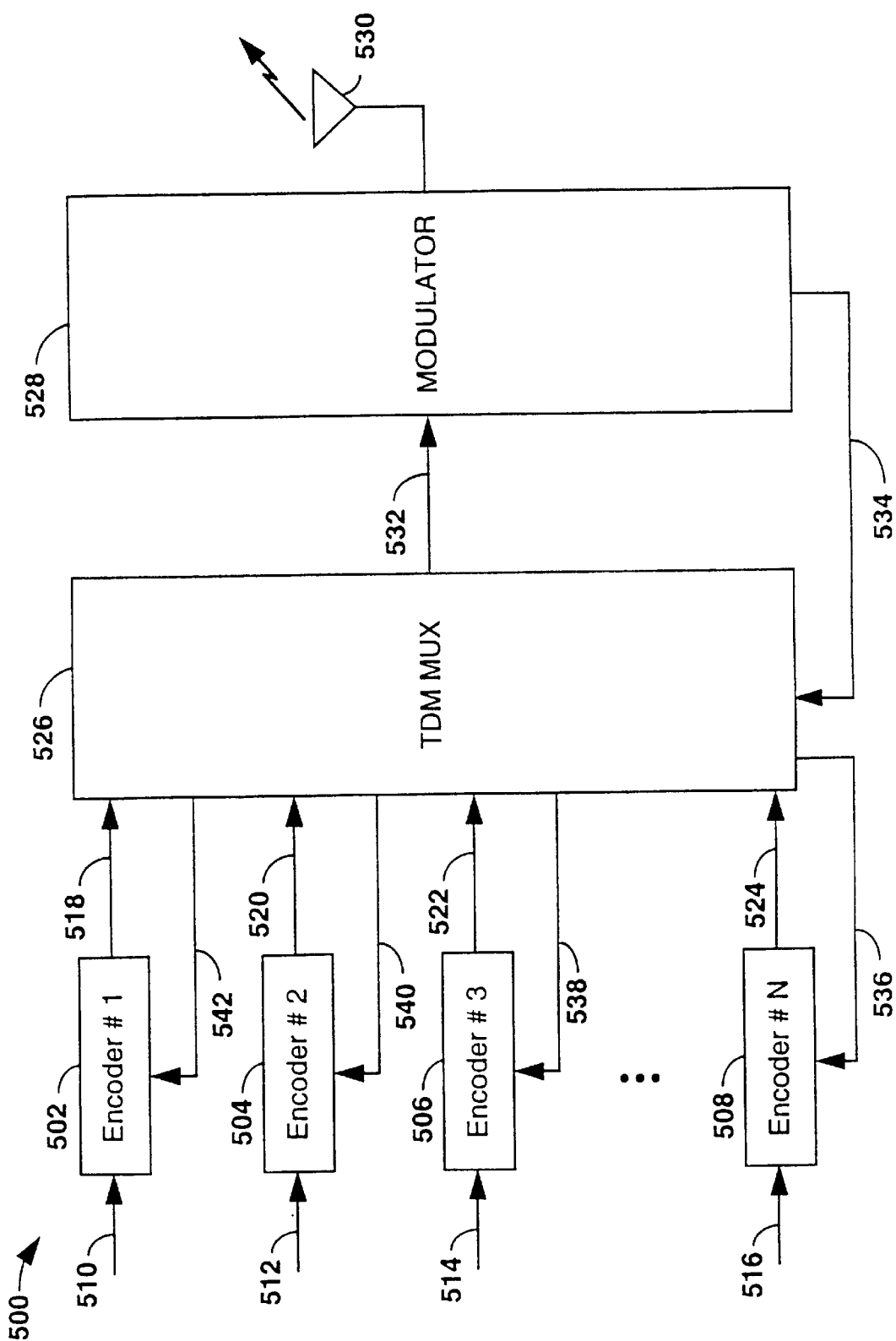

FIG. 24 illustrates a block diagram of an alternative embodiment of an audio/video encoding system according to the present invention.

Figure 25:
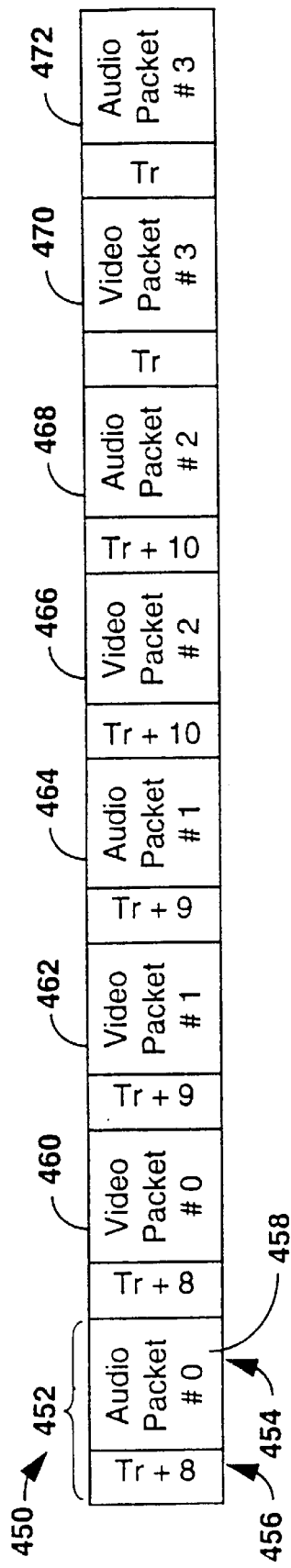

FIG. 25 illustrates a portion of an aggregate audio/video bitstream transmitted by the conventional system of FIG. 23.

Figure 26:
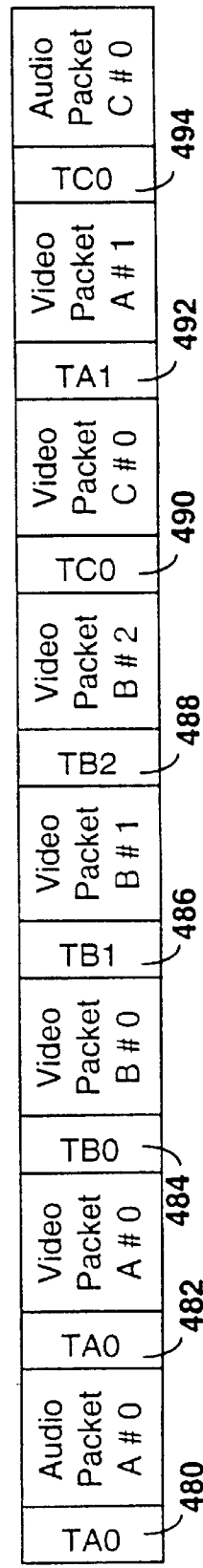

FIG. 26 illustrates an exemplary aggregate audio/video bitstream generated according to the system of FIG. 23 for multiple audio and video encoders.

Figure 27:
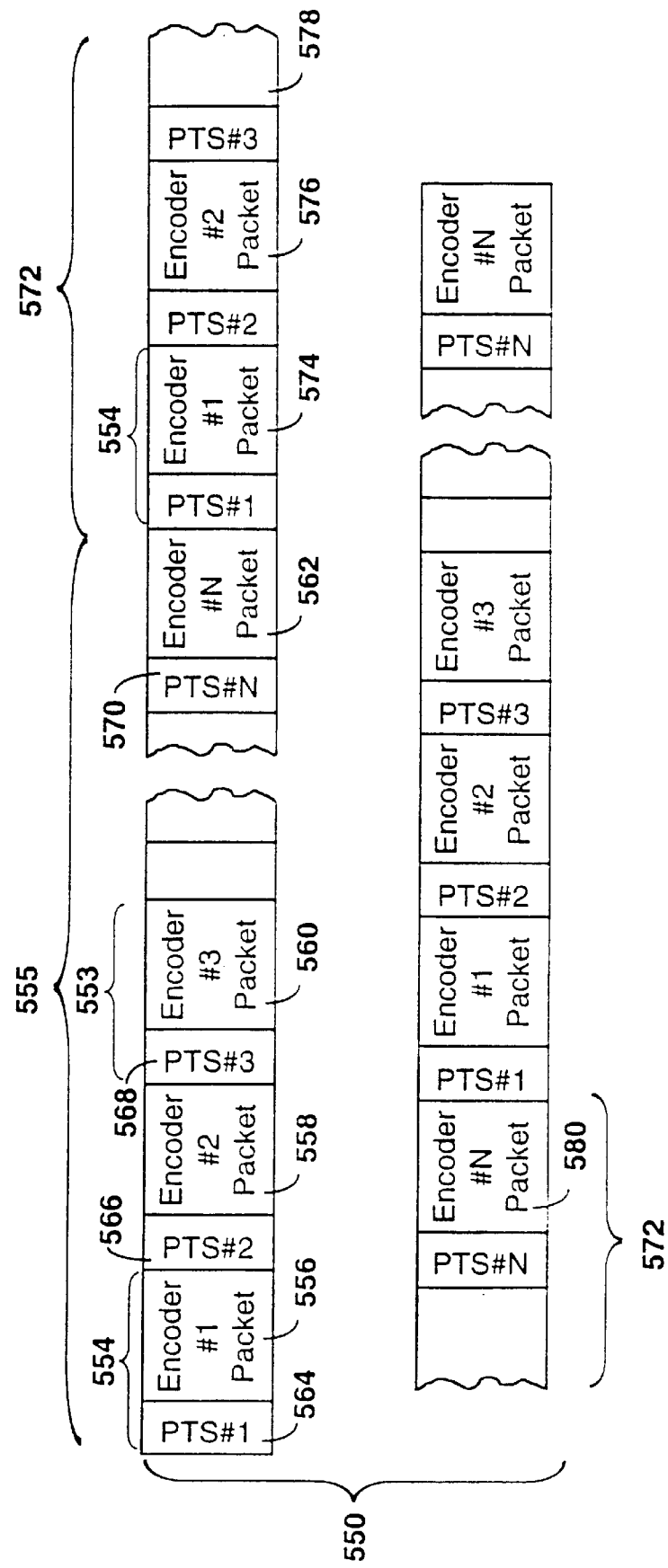

FIG. 27 illustrates an exemplary aggregate audio/video bitstream generated by the system of the alternative embodiment of FIG. 24 of the present invention.

Figure 28:
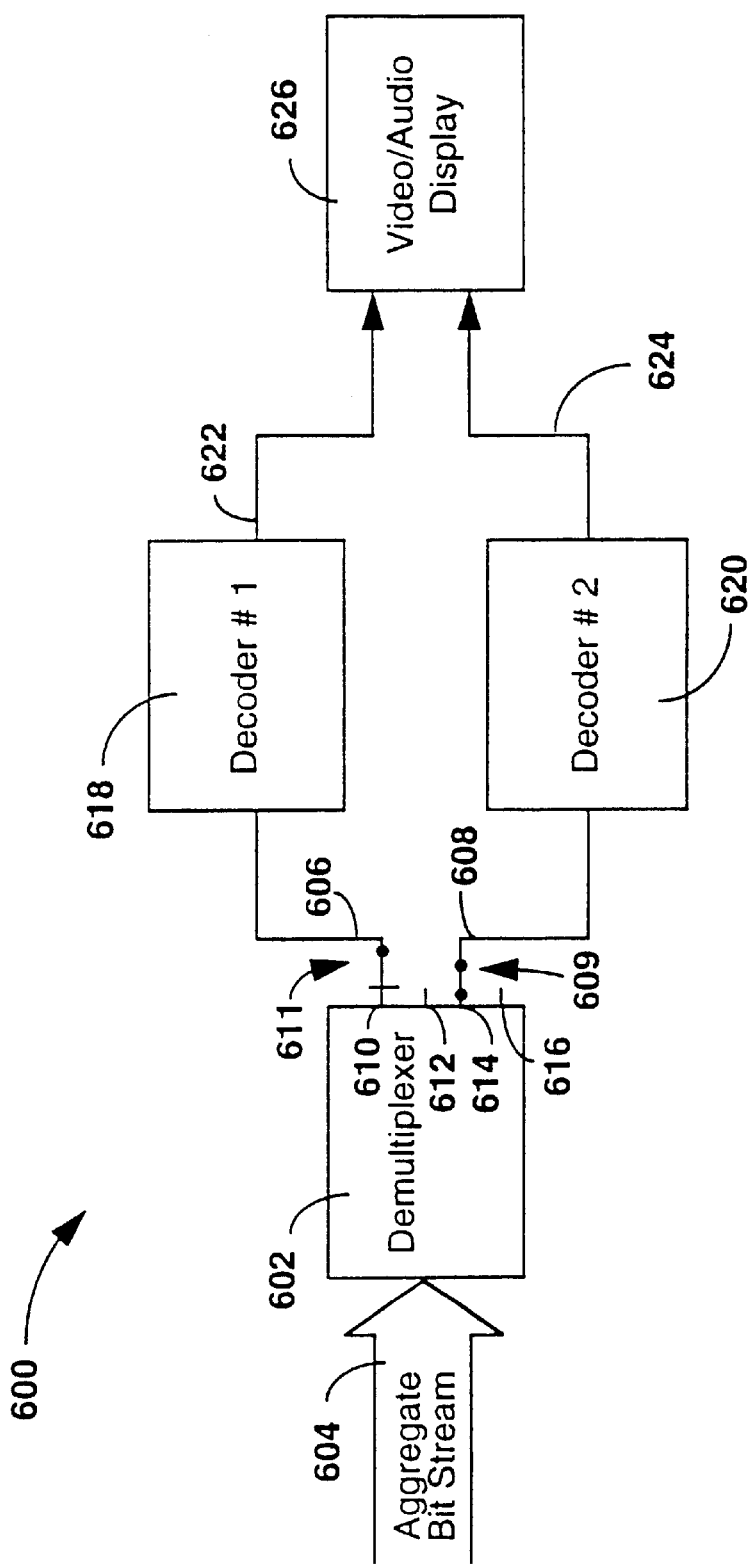

FIG. 28 illustrates a block diagram of an exemplary decoder for use in connection with the alternative embodiment of FIG. 24 of the present invention.

DETAILED DESCRIPTION OF THE PREFERRED EMBODIMENT

Referring now to FIG. 11, an MCPC system 60 is shown with a plurality of input channels 61 and a plurality of output channels 63. As with other MCPC systems a multiplexor 65 combines the various channels into a single bitstream which enters the modulator 67. The modulator 67 converts the bitstream into an RF signal 69 which enters the demodulator 71 and is converted back into a binary signal. The binary signal enters the demultiplexor 73 which separates the signal back into its component channels 63.

Figure 12:
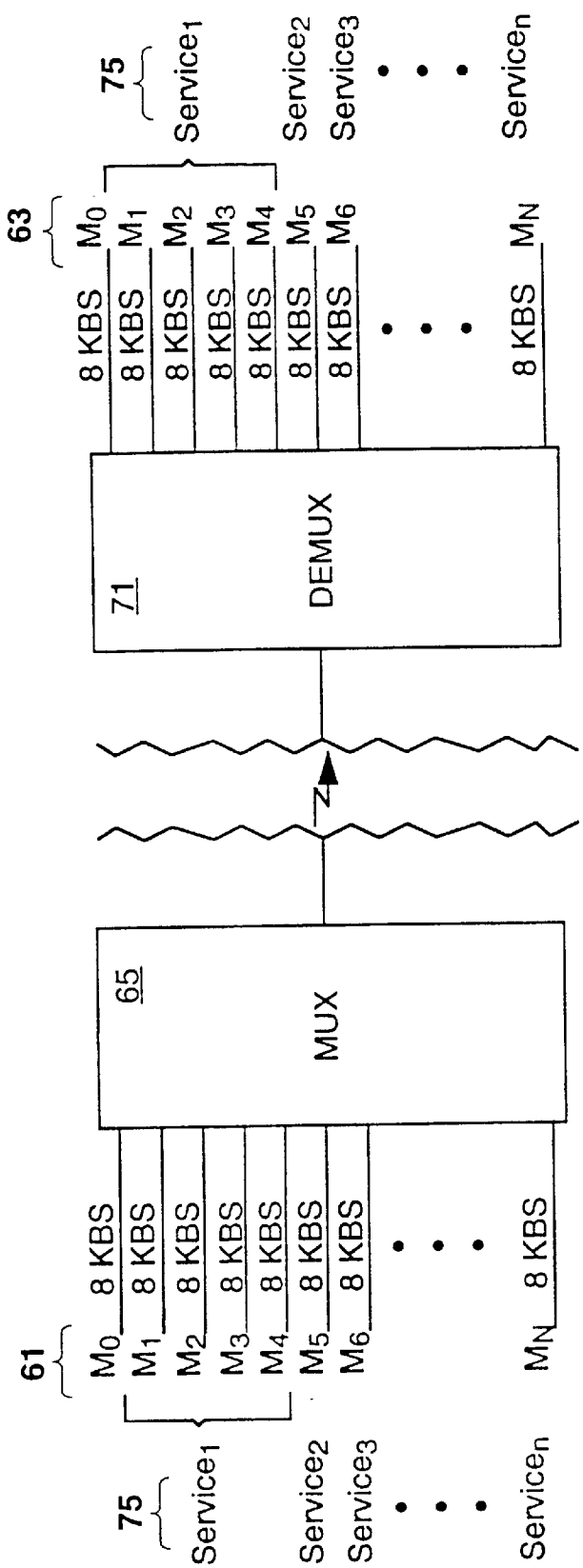
FIG. 12 shows a block diagram of the multiplexor and demultiplexor sections of the MCPC system of FIG. 11, with different channels allocated for different services.

While each channel of an MCPC system 60 might handle a variety of data rates from large to small, the preferred embodiment uses a relatively small, fixed data rate for each channel. Referring to FIG. 12 the multiplexor and demultiplexor portion of the MCPC system 60 is shown is more detail. As shown for purposes of example, for the plurality of channels 61 (numbered 0 through N), each channel (or slot) operates at 8 kilobits per second (KBS). This allows for services 75 to be tailored to each user's size and data rate needs. For example, Service$_1$ utilizes four slots to give the user a 32 KBS capability. Service$_2$ utilizes only 1 slot for a 8 KBS capability. Similarly, Service$_3$ utilizes only 1 slot for a 8 KBS capability.

The allocation of slots for services does not have to be sequential. As shown in FIG. 13, Service$_N$ 81 spans slot 1 (83), slot 2 (85), slot 4 (89), and slot 6 (93) thus creating a service with a 32 KBS data rate capability. Service$_W$ 97 spans slot 3 (87) and slot 5 (91) thus creating a service with a 16 KBS data rate capability. The slot data then enters multiplexor 99 and is modulated into an RF signal and demodulated back to binary (not shown). The demodulated binary signal then enters demultiplexor 101 for separation back into the appropriate slot and service data.

FIG. 15 shows the resulting carrier signal 110 which is generated and transmitted by the MCPC system of FIG. 13. Signal 110 is centered about frequency $f_c$ 111 and has a bandwidth (bw) indicated by 113. Carrier signal 110 contains all of the multiplexed slot information which can be extracted if the location of the services is known.

FIG. 14 shows a table of the type of information that would allow a user to locate and use a particular service on a system-wide basis (e.g. a slot allocation table, along with carrier center frequencies and bandwidths). It is preferable that the center frequency and bandwidth of a particular carrier be known to receive and demodulate the carrier signal. It is also preferable that the total number of multiplexed slots (for that particular carrier) be known to facilitate decoding of the demodulated bitstream. Optionally, the center frequency, bandwidth and/or the total number of multiplexed slots may be computed using related information, such as bandwidth and the like. For each service, the total number of slots used for that particular service should be known, as well as the particular slot numbers used. As FIG. 14 shows, Service$_N$ can be located and demodulated at center frequency $f_c$ with a bandwidth bw. The total number of slots in this MCPC system is eight. Service$_N$ uses 4 total slots with slot numbers 1, 2, 4 and 6, for a 32 KBS data rate capability. Similarly, and as part of the same carrier, Service$_W$ can be located and demodulated at center frequency $f_c$ with a bandwidth bw. Again, the total number of slots in this MCPC system is eight. Service$_W$ uses 2 total slots with slot numbers 3 and 5 for a data rate capability of 16 KBS.

With this table of information, the user can locate and use the services transmitted on a particular carrier signal. In the preferred embodiment, the slots used for each service on a particular carrier are transmitted as auxiliary header information on a designated, hardwired slot. While this designated slot might be any of the total number of slots for each MCPC system, the preferred embodiment hardwires the zeroth slot 103 as a convenient location for such slot allocation information. Hence, upon demodulating any carrier signal as configured above, the user can demultiplex the slot data and get a "map" of all services within that particular carrier by looking at the zeroth slot data. With this "map" then all the services on that carrier can be digitally reconstructed and retrieved.

Referring now to FIG. 16, in order for any particular service to use more than one slot (albeit sequential or nonsequential), a secondary set of multiplexors is used to partition the signal down to the data rate for each of the particular slots. In this example embodiment, the MCPC system 120 has four slots, each with a 8 KBS data rate. The zeroth slot 123, 143 is reserved for slot allocation data. The input base band signal 121 (or service) has a 16 KBS data rate and uses nonsequential slots 127 and 128 on the primary multiplexor 130. The secondary multiplexor 132 is used to partition the 16 KBS signal down into two bitstreams of 8 KBS as applied to slots 124, 126.

In essence, the secondary multiplexor acts like a commutative switch 134. By switching back and forth between the two slots 124, 126, the 16 KBS bitstream is halved into two 8 KBS bitstreams by alternatingly dividing the incoming bits into two different directions. Larger systems (not shown) might have an even larger multiple of input lines into the multiplexor and demultiplexor devices. Hence, the commutative switching must occur between a large number of input lines and be programmably alterable as the allocations of the services are altered or updated. Such selective, commutative switching between the multiple input lines could easily be achieved by a device such as a Field Programmable Gate Array (FPGA) or Programmable Logic Array (PLA) that has been configured for such a task.

The primary multiplexor 130 also acts like, a commutative switch 136. Multiplexor 130 switches clown across each of the slots 123, 124, 125, and 126, and thus combines the four 8 KBS bitstreams into a 32 KBS bitstream 138. Bitstream 138 is modulated, transmitted as an RF signal, and then demodulated (not shown) back into a 32 KBS signal 139. The resulting demodulated 32 KBS signal 139 is fed into the primary demultiplexor 140 which similarly acts as a commutative switch 147 to divide the 32 KBS signal into four slots 143, 144, 145, and 146 of 8 KBS each. The secondary demultiplexor 150 is connected across slots 144 and 146. Demultiplexor 150 also acts as a commutative switch 152 to alternate between the 8 KBS bitstreams of slots 144, 146 and combine them into a resulting 16 KBS signal 154.

FIG. 17 demonstrates, in tabular form, the commutative switching effect of the primary and second multiplexors and demultiplexors. Referring also to FIG. 16, the demodulated 32 KBS signal 139 is comprised of a sequence of bits as indicated by row 161. This sequence 161 is repeatedly divided across the four slots (numbered 0 through 3), by the commutative action of the demultiplexor 140, as indicated by row 163. The bitstreams are ultimately comprised of service bits which are labeled as $S^b_s$, as shown by 160. According to this notation, the superscript b represents the ongoing number of times the series of slots (0 through 3) is sampled on the primary multiplexor. Hence b also represents the ongoing bit number emerging from each slot. The subscript s represents the particular slot number.

Using this notation the assignment of the bits of the transmitted bitstream 139 to each slot 0 through 3 (elements 143–146) is shown by row 165. As the commutative action of the multiplexor 140 progresses, each bit of the incoming bitstream 139 is sequentially, and repeatedly, assigned to each slot. Slot 1 (element 144), for example, will have the bitstream $S^0_1$, $S^1_1$, $S^2_1$. . . and so on. (see element 156). Accordingly, the bits of available data emerging across the four available slots would be $S^0_0$, $S^0_1$, $S^0_2$, $S^0_3$, $S^1_0$, $S^1_1$, $S^1_2$, $S^1_3$, $S^2_0$, $S^2_1$, $S^2_2$, $S^2_3$, . . . and so on. By adding the secondary demultiplexor 150 across slots 1 and 3 (elements 144, 146), the two 8 KBS bitstreams can be combined into the 16 KBS service bitstream 154 by the commutative action 152 of the demultiplexor 150. As shown by row 167, this resulting bitstream would include $S^0_1$, $S^0_3$, $S^1_1$, $S^1_3$, $S^2_1$, $S^2_3$, . . . and so on.

Using the principles described above, a multichannel, multi-carrier (MCMC) transmission system is even more efficient at utilizing available bandwidth. With such an MCMC system, a plurality of services could be allocated across a plurality of MCPC systems. Referring now to FIG. 19, an example MCMC system is shown. In this example, three MCPC systems 170, 172, 174 are shown which generate RF carrier frequencies 171, 173, 175. Each MCPC system has, for purposes of example, four slots per multiplexor/demultiplexor.

Service$_1$ (Sv$_1$) utilizes slots 1 and 2 (elements 191 and 192) of the primary multiplexor 220 of MCPC system 170. Hence a secondary multiplexor 222 is used to divide Sv$_1$ between the two slots. Sv$_2$ utilizes slot 3 (element 193) of the primary multiplexor 220 of MCPC system 170. Sv$_3$ utilizes slot 1 (element 195) of the primary multiplexor 230 of MCPC system 172. Sv$_4$ utilizes slots 2 and 3 (elements 196 and 197) of the primary multiplexor 230 of MCPC system 172. Hence a secondary multiplexor 232 is used to divide Sv$_4$ between the two slots. Sv$_5$ utilizes slots 1, 2, and 3 (elements 199, 200, and 201) of the primary multiplexor 240 of the MCPC system 174. Hence a secondary multiplexor 242 is used to divide Sv$_5$ between the three slots.

Referring also to FIG. 18, the outputs of the primary multiplexors 220, 230, and 240 are modulated into three separate carrier signals 171, 173, and 175. In FIG. 18, two areas of unusable (or already used) bandwidth 300 and 302 are shown. As a result, carrier signal 171 has been tuned to have a center frequency f$_1$ (element 191) and a bandwidth bw$_1$ (element 192) so that signal 171 fits on the transmission spectrum before signal portion 300. Carrier signal 173 has been tuned to have a center frequency f$_2$ (element 193) and a bandwidth bw$_2$ (element 194) so that signal 173 fits on the transmission spectrum between signals 300 and 302. Carrier signal 175 has been tuned to have a center frequency f$_3$ (element 195) and a bandwidth bw$_3$ (element 196) so that signal 175 fits on the transmission spectrum after signal 302.

By tuning each carrier frequency used by the MCMC system to fit within the available transmission bandwidth on the frequency spectrum, usage of the spectrum is maximized. The Carrier signals 171, 173, and 175 are then demodulated by their respective demodulators 226, 236, and 246. The demodulated base band signals are then fed into their respective primary demultiplexors 228, 238, and 248. As described above, the service bits on the output slots 250 through 261 are multiplexed by secondary multiplexors 229, 239, and 249 to reconstruct the bitstreams for services 1 through 5 (Sv$_1$ through Sv$_5$—180, 182, 184, 186, and 188).

The preferred embodiment also utilizes one complete service—exemplified here as service$_1$—for a variety of administrative or "housekeeping" tasks. The number of slots allocated for this administrative service could vary depending upon the needs of the particular MCMC system in question. The bits in this service might be used, among other things, to perform the following functions: downloading (or uploading) software to (or from) a particular customer as needed; alphanumeric identification of services or carriers within the MCMC system or community; turning on or off various services within the MCMC system as required; and/or providing a revision number for the slot allocation table as contained in zeroth slot data.

As for transferring software, the MCMC network host might provide its service subscribers with periodic upgrades of software used to interact with the MCMC system. By allocating separate bits for this task, the service subscribers would be minimally affected by such upgrades. This would promote continual development of related software by the host and would likely result in more optimal system performance and bandwidth savings.

Similarly, the service$_1$ data might provide alphanumeric names for the various services within the MCMC network. Often this is much more useful to a user or service subscriber than a service number or other minimal identification means.

Occasionally, entire services might need to be turned on or off for maintenance and/or billing purposes. The service$_1$ data might provide such individualized control over the various services within the MCMC network.

As for the slot allocation table revision number, the zeroth slot—with its slot allocation table—will always be found in the same place on any particular demodulated and demultiplexed carrier signal, thereby acting as a "beacon" for the user to learn about that particular carrier signal. However, the remaining slots which comprise the various MCMC services can be dynamically altered and reallocated as the needs of the many users change. As a result, the slot allocation table will be revised and carry with it a new revision number. As indicated above, the administrative service (e.g. service$_1$) will show the most recent revision number. If a user is operating with an outdated version of the slot allocation table, the zeroth slot can be decoded to provide updated slot allocation information on an as needed basis.

As detailed above, the zeroth slots (input slots 190, 194, 198 and output slots 250, 254, 258) are used for slot allocation data information which will allow the user to locate, demodulate and reconstruct the various services within each particular carrier. As combined with the Service$_1$ data, a full "map" of the MCMC system can be quickly derived by the user. In operation, the disclosed device will internally switch back and forth between slot zero and Service$_1$ data as needed and carry the data on an In-Band Carrier Channel (See FIGS. 21 and 22) for processing.

For instance, upon startup of the system, a designated carrier is acquired and the slot zero data is processed via the In-Band Carrier Channel. Once the Slot Allocation Table for the carrier is acquired, the system automatically switches over to process Service$_1$ data. Service$_1$ data can provide a system-wide "map" of the MCMC system, and/or it can provide the other aforementioned Service$_1$ functions. However, if the revision number of the slot allocation table changes, the system will automatically switch back to read slot zero data until a new and updated slot allocation table is acquired. As a result, Service$_1$ is the "steady state" condition for the data on the In-Band Carrier Channel. Only when a new carrier is acquired or when the slot allocation table changes does the In-Band Carrier Channel carry slot zero again data for processing.

Referring to FIG. 20, an example table is shown with the type of slot zero data and/or Service$_1$ data necessary to locate and reconstruct all service data on all the MCMC carrier signals for this particular system. The zeroth slot will carry the slot allocation data for each particular carrier. The Service$_1$ data will provide such system-wide data as the center carrier frequencies and the carrier bandwidths for all carriers in the MCMC system. By internally switching, as necessary, between these two data sources, a complete set of system-wide information (as shown in FIG. 20) can be collected and maintained more efficiently than placing all such data on only one data path. By providing this full "map" to the system, any service can be dynamically allocated and reallocated without affecting a users ability to find, all of the services within a particular MCMC transmission system.

Accordingly, the MCMC transmission system of the present invention provides an efficient and versatile way to transmit data across available bandwidth on the transmission spectrum. The present invention utilizes the benefits of multiplexing multiple channels of information before modulating and transmitting the information as a carrier signal. Additionally, the present invention allows for users of all sizes to utilize only the particular amount of data transfer capability that they need. Hence, individual services can range in size from the basic rate of one slot (e.g. 8 KBS) on up to the entire capability of the entire MCMC transmission system. Moreover, the present MCMC system utilizes multiple carrier signals to transmit the allocated data services. A slot of header data is reserved in each carrier signal which provides the location of all services within that carrier. A separate service (e.g. one or many slots) might also be allocated for system administration and/or system-wide mapping.

Referring now to FIG. 21, a block diagram of the multiplexor configuration is shown as used in the preferred embodiment of the disclosed MCMC system. A microprocessor 300 is used to control the flow of the incoming service data. Accompanying hardware to the microprocessor 300 includes a flash memory 318 for program storage, a ram 320 for storage of variables and processor operation, and NV memory 322 for parameter storage. While any microprocessor might adequately perform such control, the preferred embodiment uses a Motorola 68302 and was chosen because of its preferred instruction set, data handling capabilities, reasonable cost and development toolset available.

The microprocessor 300 writes information relating to the aforementioned slot allocation table into a dual port RAM 318. As detailed above, the slot allocation table contains information regarding the various carrier center frequencies, the carrier bandwidths, and the slots used for each service (e.g. "format information"). Such format information might enter the microprocessor from a variety of sources. The preferred embodiment uses a separate computer system, known as a Network Management System (NMS) 316, to solicit and manage this format information. The NMS 316 uses a Windows application program to query and accept format information from an operator. The format information is then fed into the microprocessor 300 via a serial RS232 data link 317.

As shown in this embodiment, Ports A through XX (elements 301 through 306) represent input ports for individual services (henceforth service ports) which are composed of one or more data slots (e.g. 8 KBS slots as discussed above). Since each service port might consist of one or more data slots, each service port has its own clock rate based upon the number of data slots designated for that particular service on that particular service port. For instance, a service port using five 8 KBS slots would have a higher clock rate (e.g. 40 kilohertz) than a service port using only one 8 KBS slot. As with other synchronous systems, this embodiment utilizes one clock cycle per bit.

Such control data is maintained and transmitted via an In-Band Control Channel 324 which carries information gleaned from the zeroth slot and the administrative service (previously exemplified as Service$_1$).

The service ports 301–306 are queued into a multiplexor control device 308 via a series of FIFO (first in, first out) buffers 307–312. The FIFO outputs enter the multiplexor control device 308 through a bus 313 in the order requested by the multiplexor control. The multiplexor request sequence is a function of the information format for the MCMC system. As mentioned above, such multiplexor control and processing is achieved through a programmable device such as an FPGA. The FIFO'ed service port data is then multiplexed via multiplexor control 308 into an aggregate data stream 314 which is output to a modulator (not shown) for modulation and transmission to a respective receiver.

Referring now to FIG. 22, a block diagram of the receiver configuration is shown as used in the preferred embodiment of the disclosed MCMC system. In this configuration, a demodulator 350 converts the transmitted carrier signal (not shown) into an aggregate data stream 352 which enters a demultiplexor control block 354. As with the multiplexor before, demultiplexor control is also achieved via an FPGA device.

The demodulator 350 is controlled via a microprocessor 356. As with the multiplexor configuration, accompanying hardware to this separate microprocessor 356 includes a flash memory 358 for program storage, a ram 360 for storage of variables and processor operation, and NV memory 362 for parameter storage. Again, a Motorola 68302 was used for similar reasons and advantages as stated above.

The microprocessor 356 gleans format information data (e.g. slot zero and administrative Service, information) from an In-Band Control Channel 364 as fed from demultiplexor control 354. Such format information is written into a Dual Port RAM 366 in the form of a Slot Allocation Table. The demultiplexor control 354 then reads this Slot Allocation Table data from the Dual Port RAM 366 and uses this data in order to properly demultiplex the demodulated bitstream 352 into the various services. Once properly demultiplexed, the services are output as the various service Ports A–F (elements 368–373). As comparable to the multiplexor configuration, each service port might consist of one or more data slots, with each service port having its own clock rate based upon the number of data slots designated for that particular service on that particular service port. Having now been received and decoded, the MCMC services of this particular system can now accessed via the service ports 368–373.

FIG. 24 illustrates an alternative embodiment of the present invention. In the embodiment of FIG. 24, a system 500 is provided for digitally encoding and transmitting multiple audio and video signals related to one another. The system 500 includes a plurality of encoders 502–508 which receive corresponding input signals along lines 510–516. The input signals at lines 510–516 may be analog or digital. If the input signals represent digital signals, the encoders 502–580 may include A/D converters to provide digital input signals. The input signals at lines 510–516 may represent any combination of audio and video signals.

By way of example, the input signal at line 510 may represent a video signal, while the remaining input signals at lines 512–516 represent audio signals. Optionally, the audio signals at lines 512–516 may relate to the video signal at line 510. For instance, each of lines 512–516 may carry the speech portion of a television show, sports event and the like in separate languages. Hence, line 510 may carry the video signal for a movie, while line 512 carries the audio signal for the movie in English, line 514 carries the audio signal for the movie in French and line 516 carries the audio signal for the movie in German.

Optionally, the input lines 510–516 may carry any desired combination of audio and video signals, such as one audio signal with three video signals, one video signal with four audio signals, two video signals with six audio signals and the like.

For purposes of explanation, the alternative embodiment contemplates using a single video signal at line 510 with multiple related audio signals at lines 512–516 carrying audio signals of different languages.

The encoders 502–508 output encoded audio and video signals along lines 518–524 as packetized bit streams which are formatted, as explained above. The individual streams of packetized data are supplied to a multiplexor 526 which combines the input signals to form an aggregate bitstream output along line 532. The multiplexor 526 combines the data packets from lines 518–524 in a time division multiplexed manner to form the aggregate bit stream 550 (FIG. 27). The aggregate bitstream is supplied to a modulator 528 which outputs same via link 530. Optionally, the encoders, multiplexor and modulator may include internal memory and buffers to temporarily store data. Data is transmitted to and read from this temporary storage in a first-in-first-out manner.

Control lines 534–542 are provided as feedback to control the transmission rate at which packets of data are transmitted from the encoders 502–508 to the multiplexor 526 and from the multiplexor 526 to the modulator 528. Optionally, the transmission rates and timing of the encoders, multiplexor and modulator may be controlled from a remote processor (not shown).

Next, the discussion turns to FIG. 27 which illustrates an exemplary aggregate bitstream 550 generated by the multiplexor 526 based on a time division multiplexing technique. The aggregate bitstream 550 includes a plurality of data sets 555, each of which includes a single slot or channel 554 assigned to each encoder 502–508.

During operation, the multiplexor 526 accesses the multiplexer's internal memory/buffers for each of lines 518–524 to obtain a set of data packets containing a single data packet associated with each input line 518–524. The multiplexor 526 combines this set of data packets as illustrated in FIG. 27 in a time division multiplexed manner. Consecutive slots 554 receive a corresponding data packet from the assigned input line 518–524. Thus, each slot 554 of a data set 555 includes a single data packet 556–562 for each encoder 502–508. Optionally, each of packets 556–562 includes a presentation time stamp 564–570. The presentation time stamps 564–570 represent offsets with respect to internal reference timers of corresponding encoders 502–508 as explained.

Once the data set 555 is formed in the multiplexor 526, the set 556 is transmitted to the modulator 528. Thereafter, the multiplexor 526 generates a next data set 572 of packets 574–580. This process may be continually repeated throughout operation.

While the preferred embodiment of FIG. 24 illustrates far encoders, it is understood that any number of encoders may be utilized. Each data set 555, 572 of data slots 554 will be modified to include one slot per encoder.

FIG. 28 generally illustrates a decoding system 600 according to the present invention. The decoding system 600 includes a demultiplexor 602 which receives the aggregate bitstream 604 as its input. The demultiplexor 602 separates each data set 555 (FIG. 27) of data packets 556–562. The demultiplexor 602 and transmits a data packet from a single slot 554 in the set 555 along a corresponding output line 606 and 608.

More specifically, decoder demultiplexor 602 includes one output port 610–616 for each slot 554 of an incoming data set 555. For a given data set 555, the demultiplexor 602 delivers the data packet from slot #1 to the first port (e.g., 610), the data packet from slot #2 to the second port (e.g., port 612), and the like. The decoding system 600 may connect decoders 618 and 620 to predetermined output ports of the demultiplexor 602 through switches 609 and 611. The connected output ports correspond to slots 554 in the aggregate bitstream which contain desired data.

In the example of FIG. 28, it is desirable to decode the data streams from the first and third encoders (502 and 506 in FIG. 24). Hence, decoders 618 and 620 are connected at switches 609 and 611 along lines 606 and 608 to output ports 610 and 614, respectively.

With reference to FIG. 27, decoder 618 decodes all packets 556 within the first slot of each data set 555. Decoder 620 decodes all packets 560 received within the third slot 553. The decoders 618 and 620 may output analog signals corresponding to the decoded bitstreams along lines 622 and 624, respectively. The analog signals are supplied to a display 626 which presents corresponding audio and video information to a viewer.

By way of example, when the aggregate bitstream 604 includes a single video signal (such as corresponding to a movie) and a plurality of audio signals (such as corresponding to the soundtrack for the movie recorded in multiple languages), decoder 618 may decode the video signal, while decoder 620 decodes an associated audio signal for a desired language (e.g., English, French, German and the like). Thus, the display 626 may play a movie with a French soundtrack. Alternatively, by connecting the decoder 620 to one of ports 612 and 616, the display 626 may output the audio track in a different language.

According to the example explained above, the preferred embodiment of the present invention enables multiple audio signals to be transmitted in different languages with a single related video signal. Hence, the need is avoided for transmitting separate video signals for each audio signal.

While several alternative embodiments, of the invention have been described hereinabove, those of ordinary skill in the art will recognize that the embodiments may be modified and altered without departing from the central spirit and scope of the invention. Thus, the embodiments described hereinabove are to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A method for dynamic allocation of transmission bandwidth resources, said method comprising the steps of:

receiving data from a plurality of user services having predefined data service transmission rates, one of the plurality of user services having a transmission rate M and a second of the plurality of user services having a transmission rate N;

providing a plurality of slots within the transmission bandwidth resources, each of said slots represent a channel having a predefined data channel transmission rate Y;

selectively allocating either consecutive or nonconsecutive slots to said one and second user services, said first one of the plurality of user services being allocated a number of consecutive or non-consecutive slots W, where W*Y is equal to or greater than the transmission rate of the one of the user services said second user service being allocated a number of consecutive or non-consecutive slots Z, where Z*Y is equal to or greater than the transmission rate of the second of the user services, wherein M, N, W, and Y are integers; and transmitting data received from said user services in said slots according to said selective allocation step to a satellite receiver.

2. A method according to claim 1, further comprising the step of utilizing at least one of said slots to carry slot mapping information identifying allocation of said slots among said services.

3. A method according to claim 1, further comprising the step of transmitting as auxiliary header information, an allocation map defining a relationship between each service and one or more associated slots.

4. A method according to claim 1, wherein said allocating step includes dynamically allocating and re-allocating said slots to one or more of said user services as said user services change in quantity or data rate.

5. A method according to claim 1, wherein said providing step includes defining said slots wherein each slot has the same fixed common data channel transmission rate.

6. A method according to claim 1, wherein one or more user services may include audio information and the second user service may include video information.

7. A method according to claim 2, wherein one or more user services may include audio information and the second user service may include video information.

8. A method according to claim 3, wherein one or more user services may include audio information and the second user service may include video information.

9. A method according to claim 4, wherein one or more user services may include audio information and the second user service may include video information.

10. A method according to claim 1, wherein said first one of the plurality of user services has a transmission rate M in which M is greater than or equal to Y, the method further comprising the steps of:

dividing data received from at least the first one of the plurality of services into at least two bitstream portions, each of which are allocated to different slots; and combining bitstream portions from all user services into allocated slots to yield an aggregate bitstream, said dividing and combining steps being performed based on said selective allocation step.

11. A method according to claim 1, further comprising the step of maintaining a slot allocation table mapping a relation between services and slots and inserting said slot allocation table in one or more slots in the transmission bandwidth resources for transmission of said table along with the transmission data to a satellite receiver.

12. A method according to claim 1, further comprising, in the allocating step, updating and reallocating slots between or among one or more services when a service transmission rate of at least one user service changes.

13. A multiple channel, multiple carrier transmission system for transmitting data from a plurality of user services over dynamically allocated transmission bandwidth resources, said system comprising:

a plurality of input channels, each for carrying data at a predefined service data rate;

a multiplexor for combining the data from said input channels into an aggregate bitstream comprising a plurality of data slots, each of said data slots having a predefined data channel transmission rate rate Y;

a modulator for converting said aggregate bitstream into an RF signal for transmission to a satellite; and a slot allocator, communicating with said input channels, for selectively allocating input channels and associated slots to a first user service having a transmission rate of M and a second user service having a transmission rate of N, the slot allocator selectively allocating a first consecutive or non-consecutive number of slots W to the first user service where W*Y is greater than or equal to the transmission rate M, the slot allocator selectively allocating a second consecutive or non-consecutive number of slots Z to the second user service where Z*Y is greater than or equal to the transmission rate N, wherein M, N, W, and Y are integers.

14. A system according to claim 13, wherein said slot allocator cooperates with said multiplexor to: (i) allocate slots in the aggregate bitstream; and (ii) insert a slot allocation table into the bitstream, whereby a receiver may receive and de-multiplex the bitstream according to information provided by the slot allocation table.

15. A system according to claim 14, wherein said slot allocation table is inserted into at least one predetermined slot and includes a map defining a relation between user services and slots associated with each such user service.

16. A system according to claim 14, wherein the slot allocator is adapted to dynamically alter the slot allocation and the associated slot allocation table, in response to change in the user services or at least one of their associated data rates.

17. A system according to claim 15, wherein the slot allocator is adapted to dynamically alter the slot allocation and the associated slot allocation table, in response to change in the user services or at least one of their associate data rates.

18. A system according to claim 16, wherein one user service may include at least audio information and a second user service may include at least video information.

19. A system according to claim 17, wherein one user service may include at least audio information and a second user service may include at least video information.

20. A system according to claim 13, wherein said slot allocator updates and reallocates slots between user services when a service transmission rate of at least one user services changes.

* * * * *